United States Patent [19]

Haba

[11] Patent Number: 5,367,508
[45] Date of Patent: Nov. 22, 1994

[54] MAGNETIC FIELD GENERATION MECHANISM FOR MAGNETO-OPTICAL RECORDING

[75] Inventor: Shinji Haba, Suwa, Japan

[73] Assignee: Seiko Epson Corporation, Tokyo, Japan

[21] Appl. No.: 16,824

[22] Filed: Feb. 10, 1993

[51] Int. Cl.$^5$ .................. G11B 11/00; G11B 5/127
[52] U.S. Cl. ................................ 369/13; 360/114
[58] Field of Search ............... 360/59, 114; 369/13, 369/59

[56] References Cited

U.S. PATENT DOCUMENTS

| | | | |
|---|---|---|---|
| 4,862,437 | 8/1989 | Okada | 369/13 |
| 4,984,226 | 1/1991 | Kobori | 369/13 |
| 5,022,018 | 6/1991 | Vogelgesang | 369/13 |
| 5,088,074 | 2/1992 | Sato | 369/13 |
| 5,218,488 | 6/1993 | Berg | 369/13 X |
| 5,220,544 | 6/1993 | Kikuchi et al. | 369/13 |
| 5,243,580 | 9/1993 | Maeda | 360/114 X |

FOREIGN PATENT DOCUMENTS

| | | |
|---|---|---|
| 226455 | 10/1987 | Japan . |
| 317903 | 12/1988 | Japan . |
| 7301 | 1/1989 | Japan . |
| 155538 | 6/1989 | Japan . |
| 256250 | 11/1991 | Japan . |
| 295004 | 12/1991 | Japan . |

OTHER PUBLICATIONS

Optical Data Storage Topic Meeting "Direct Overwriting System by Light Intensity Modulation Using Triple-Layer Disks" F. Maeda et al., Sony Corp. 1991.

*Primary Examiner*—Donald Hajec
*Assistant Examiner*—T. N. Forbus, Jr.
*Attorney, Agent, or Firm*—Harold T. Tsiang

[57] ABSTRACT

A magnetic field generation mechanism is confirmed by combining a plurality of magnets that generate magnetic fields in different directions. Since the magnetic field strength of the magnet for initialization magnetic field can be increased without increasing its thickness by providing a magnet for amplification that generates a magnetic field in a direction perpendicular to the magnet for initialization, a compact, thin device can be realized utilizing a magneto-optical recording device capable of direct overwrite on switched connection multilayer film. Further, by including a rotatable biased magnet, the device can also be used on prior art rewritable magneto-optical discs.

28 Claims, 19 Drawing Sheets

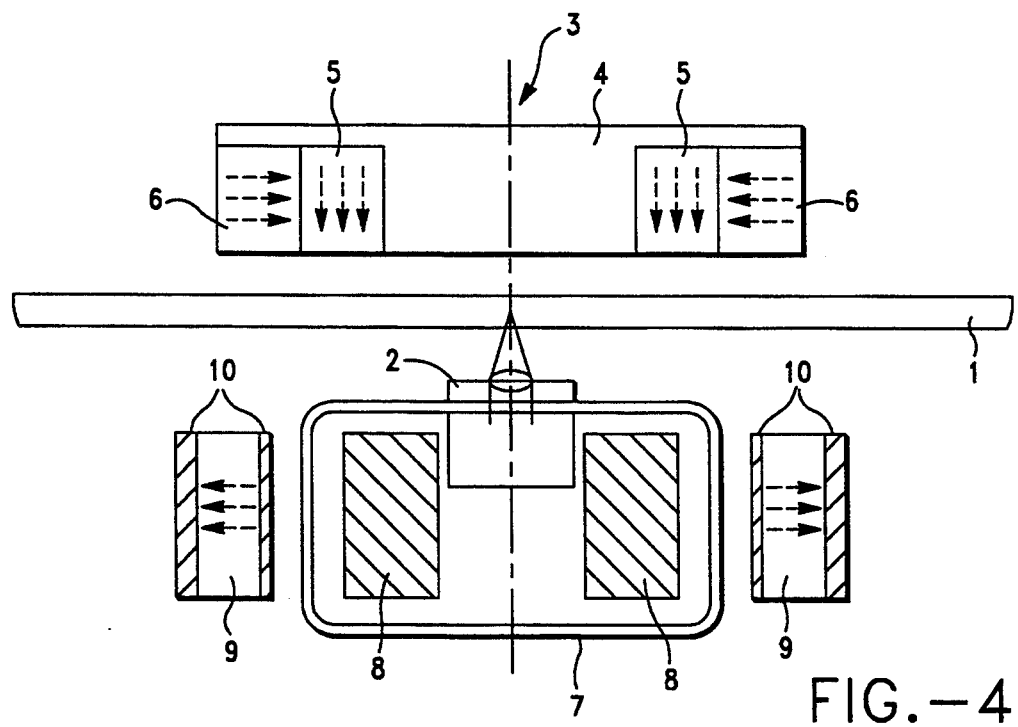
FIG.—4
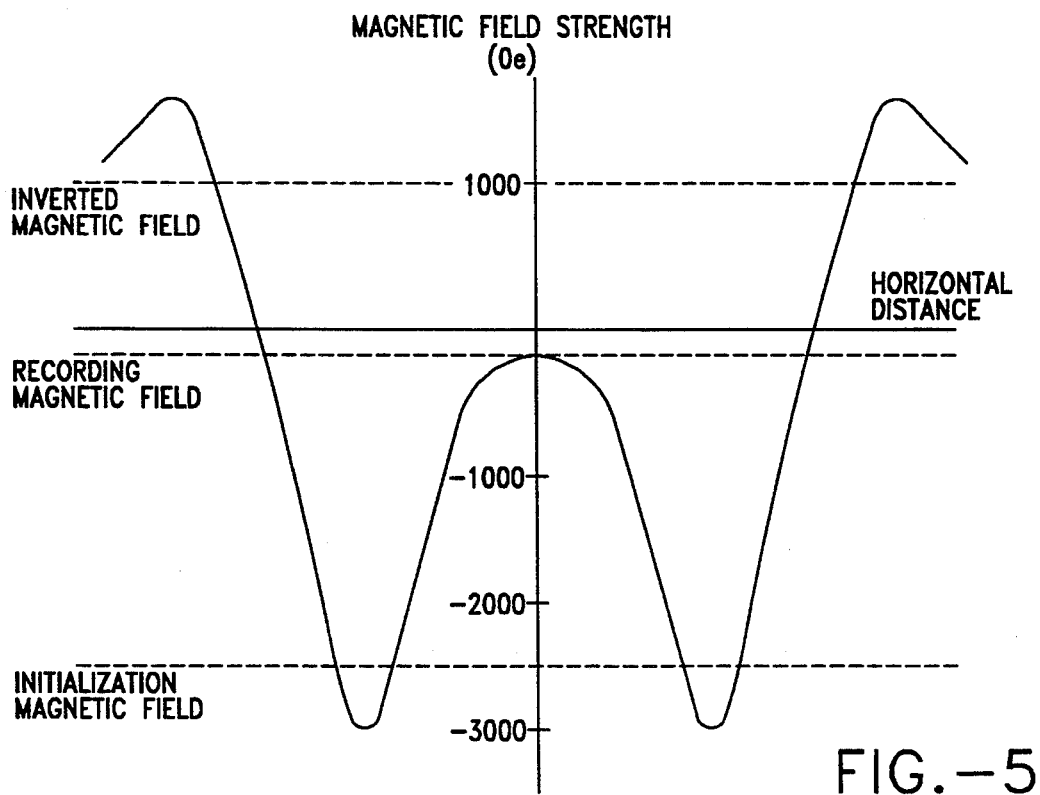
FIG.—5

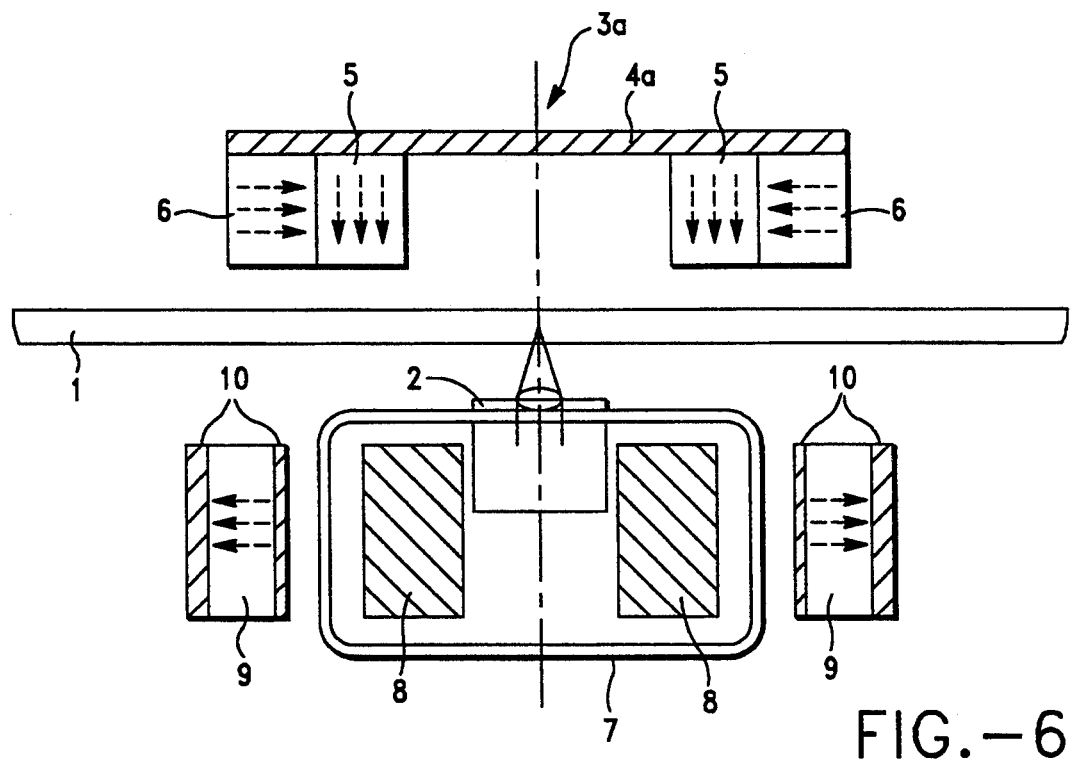
FIG.—6
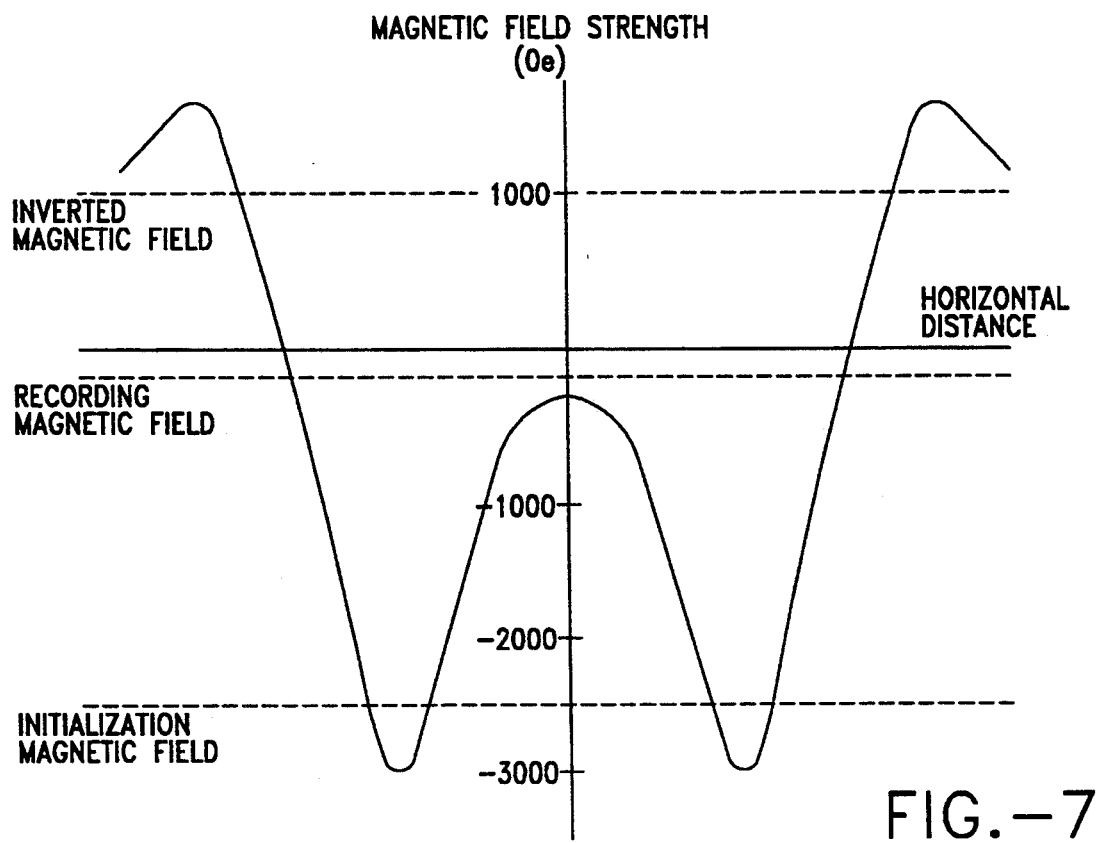
FIG.—7

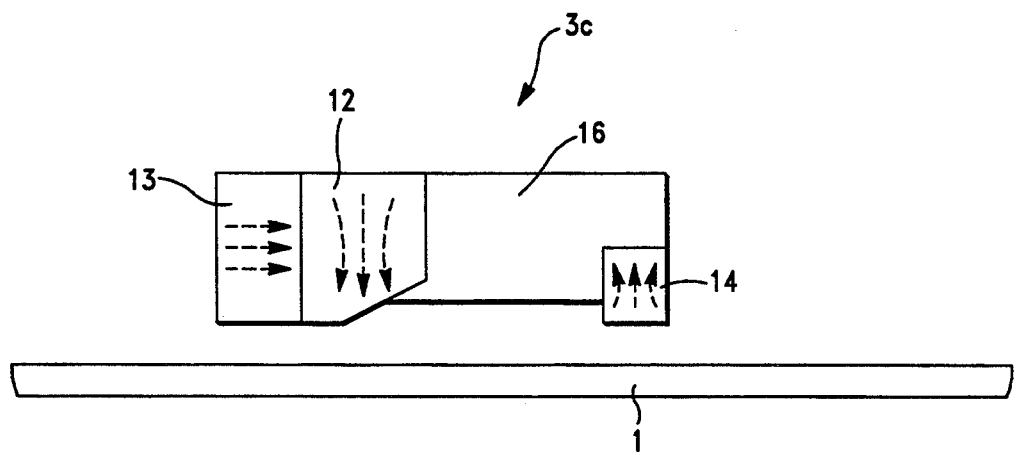
FIG.—11
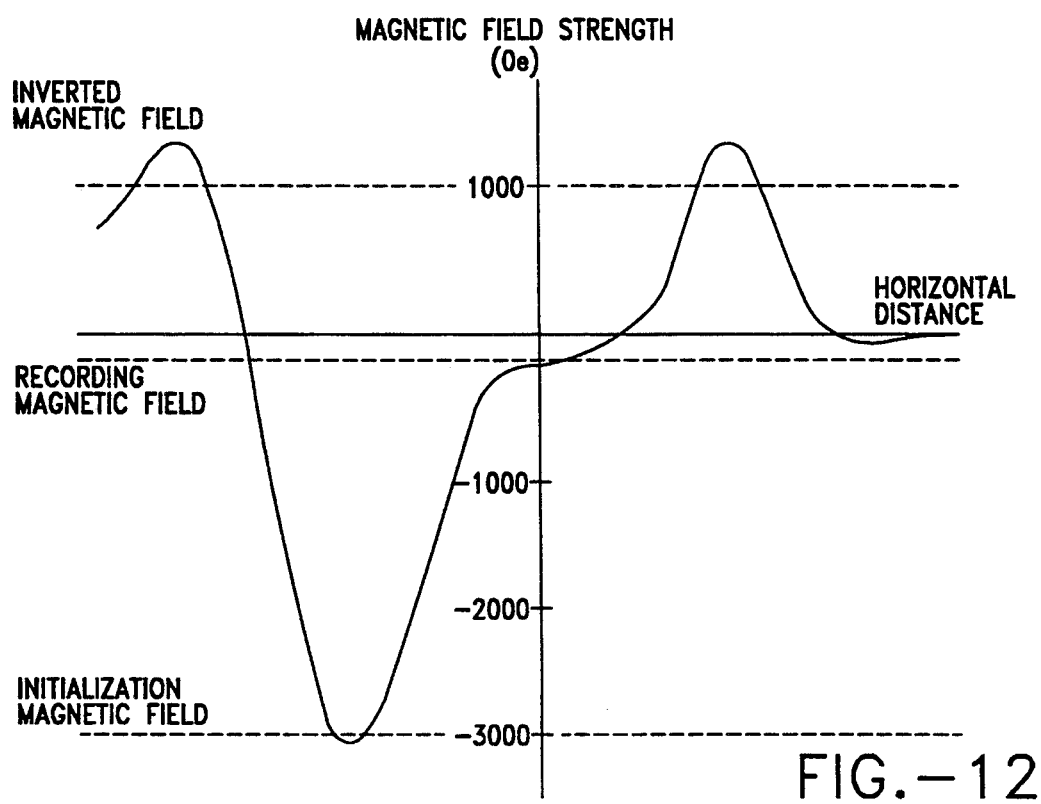
FIG.—12

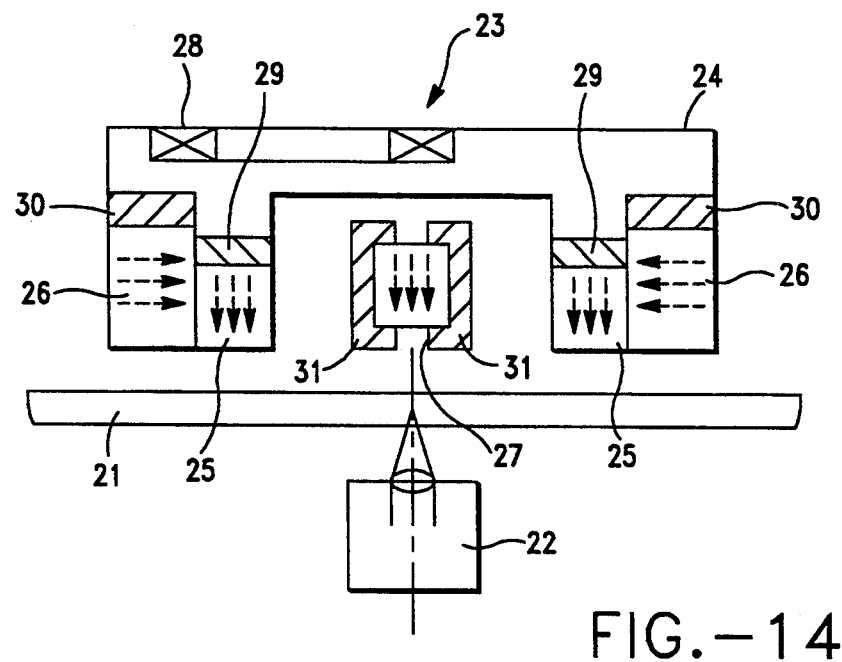
FIG.—14
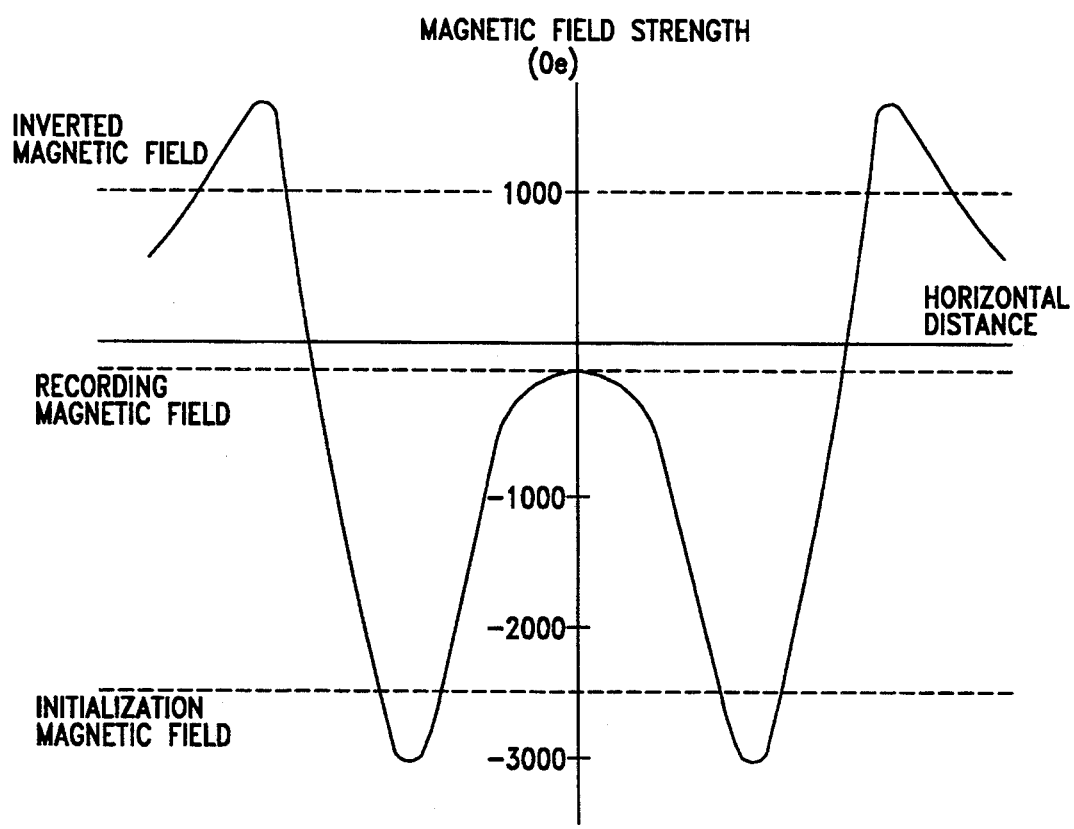
FIG.—15

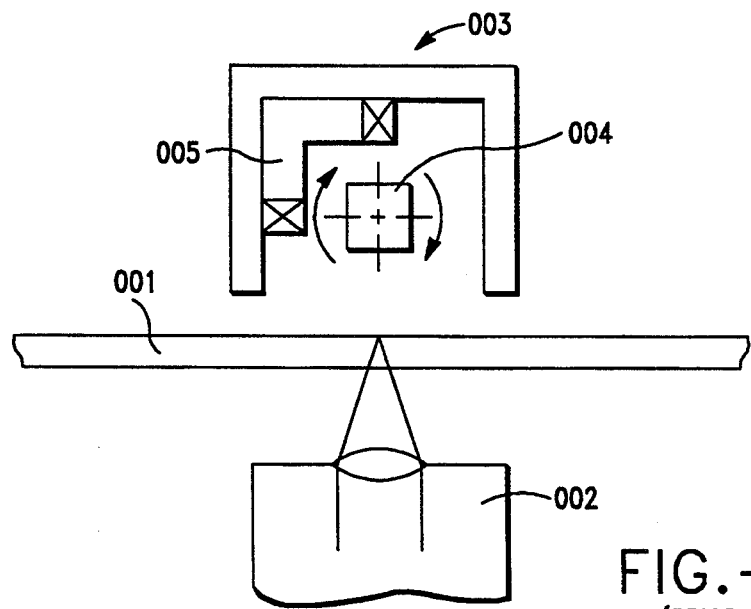
FIG.−24
(PRIOR ART)
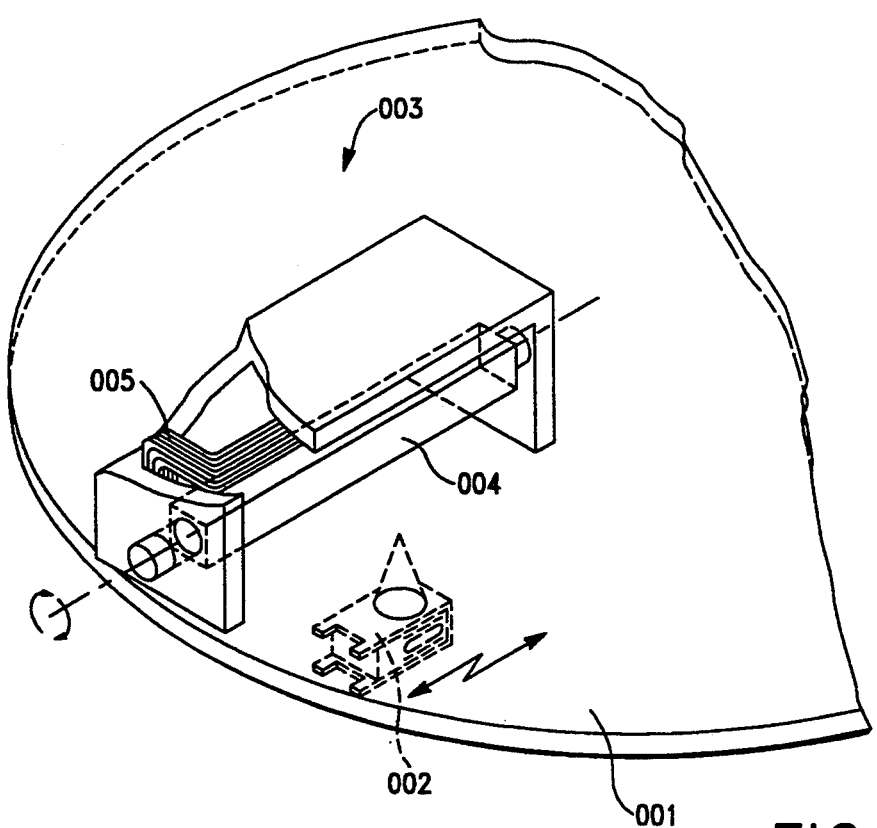
FIG.−25
(PRIOR ART)

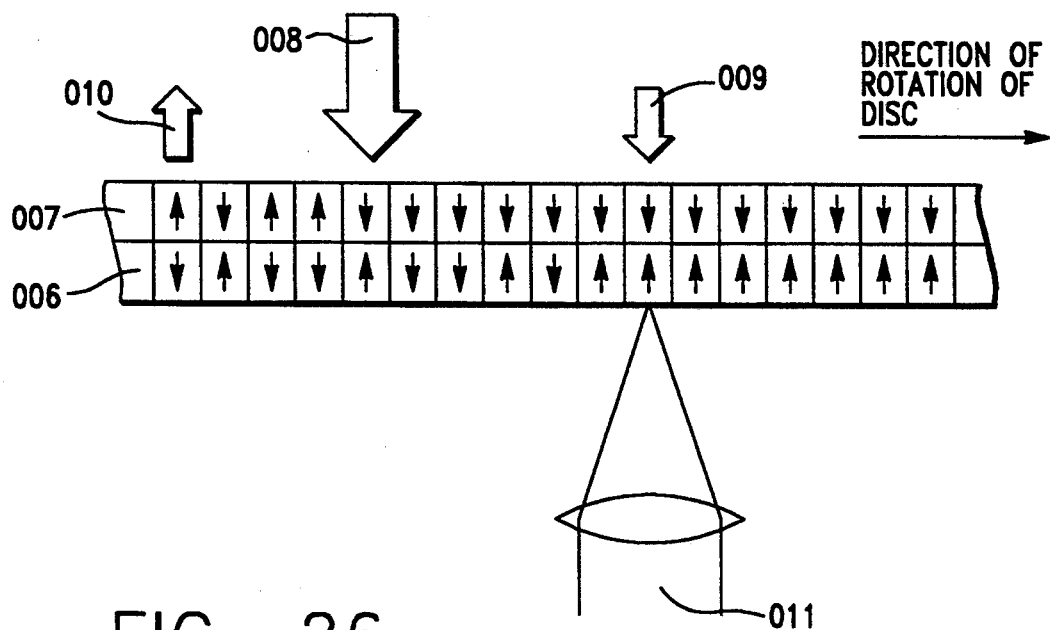
FIG.—26
(PRIOR ART)
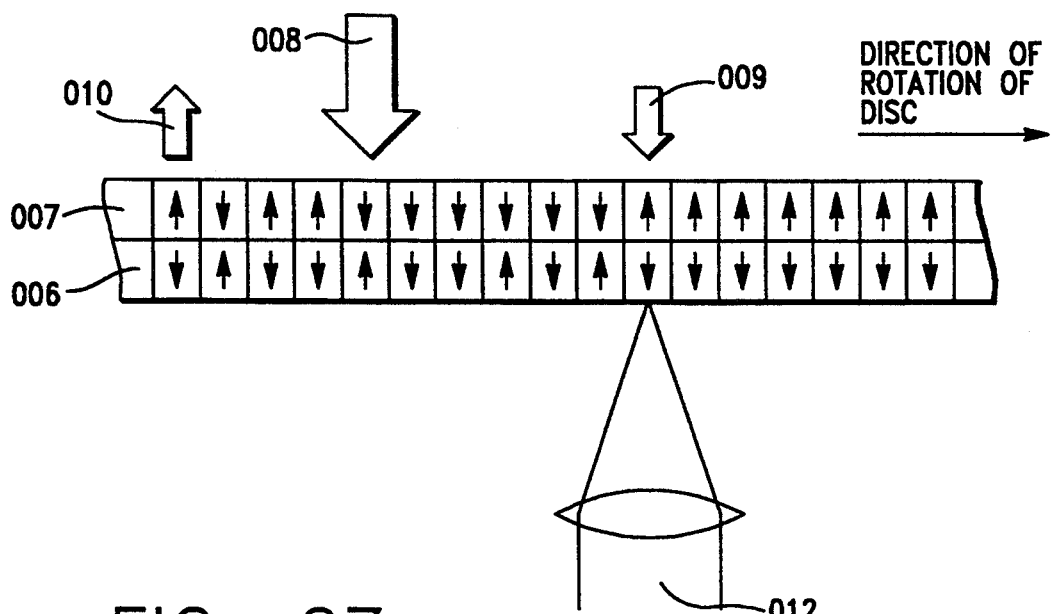
FIG.—27
(PRIOR ART)

MAGNETIC FIELD GENERATION MECHANISM FOR MAGNETO-OPTICAL RECORDING

BACKGROUND OF THE INVENTION

The invention relates generally to magnetic field generation mechanisms used in compact, thin magneto-optical recording/playback devices that record and erase by impressing a prescribed biased magnetic field on a magneto-optical disc. The magneto-optical disc may be made from a switched connection multilayer film capable of direct overwrite by two or more magnets that generate magnetic fields in different directions. Discs other than switched connection multilayer film magneto-optical discs may also be used.

In recent years, magneto-optical systems are implemented as external recording devices for computers. The magnetic field modulation system shown in FIGS. 24 and 25 is a known magneto-optical recording system in the prior art. This magnetic field modulation system writes data by heating a magneto-optical disc 001 to near the Curie temperature by spot irradiation of a laser beam from an optical head 002 and controlling the direction of the biased magnetic field impressed from a magnetic head 003.

Here, optical head 002 is disposed such that it can move in the radial direction of the magneto-optical disc, and can be moved to a prescribed position by the electromagnetic force applied by a magnet and a coil for optical head movement (not shown). A biased magnet 004 is supported by magnetic head 003 and can rotate freely within a prescribed angular range in the direction indicated by the arrows. A coil 005 for biased magnetic field is disposed so that it can rotate biased magnet 004 by the action of electromagnetic force. Therefore, by energizing coil 005 and thereby rotating biased magnet 004 to a certain angle, the direction of the biased magnetic field generated from biased magnet 004 can be controlled to the desired direction.

Data recording and erasing by this system of magnetic field inversion are performed as follows. First, in the case of erasing old data, the direction of the magnetic field generated from biased magnet 004 is set to a direction that denotes erasure. Laser beam is then continuously irradiated from optical head 002 on magneto-optical disc 001 so that it heats the disc to near the Curie temperature. Magneto-optical disc 001 heated to the Curie temperature looses its coercive force. When it cools, the disc is magnetized in the same direction as the biased magnetic field, i.e., a direction that denotes erasure.

Next, coil 005 is energized. Thus, electromagnetic force acts on biased magnet 004 and inverts it to a direction that denotes recording. The laser beam is then irradiated on magneto-optical disc 001 at the recording position so that it heats the disc near the Curie temperature. Magneto-optical disc 001 heated to the Curie temperature looses its coercive force. When it cools, the disc is magnetized in the same direction as the biased magnetic field, i.e., a direction that denotes recording.

In this way, in the magnetic field inversion system, magneto-optical disc 001 is rotated once to erase old data, and then magneto-optical disc 001 is rotated once again to write new data, thus requiring the magneto-optical disc to be rotated for a total of two times.

To solve this problem, systems referred to as direct overwrite have been actively researched recently. These systems erase old data while writing new data in one rotation of the magneto-optical disc. Two of these systems are known as the magnetic field modulation system and the light modulation system.

Of the light modulation systems, there is a system that uses a switched connection multilayer film. In the switched connection two-layer film system, which is the fundamental configuration of this type of system, a recording layer and an auxiliary layer are formed on the surface of the magneto-optical disc. Data are recorded and erased by applying an external initializing magnetic field and a recording magnetic field and controlling the strength of the laser beam irradiated on the recording layer. It is also known that by applying an inverted magnetic field whose direction is opposite to that of the recording magnetic field, data erasing can be facilitated.

The recording principle of the system that uses the switched connection two-layer film is illustrated in FIGS. 26 and 27. As shown in both figures, a recording layer 006 and an auxiliary layer 007 are formed on the magneto-optical disc. An initializing magnetic field 008, a recording magnetic field 009 and an inverted magnetic field 010 are impressed perpendicularly from outside as indicated by the arrows. Initialization magnetic field 008 and recording magnetic field 009 have the same direction. Inverted magnetic field 010 has an opposite direction. Also, initialization magnetic field 008 is larger than recording magnetic field 009.

The magnetic characteristics of recording layer 006 and those of auxiliary layer 007 vary depending on the temperature as shown in FIG. 28. At room temperature, the coercive force of recording layer 006 is higher than initialization magnetic field 008, while the coercive force of auxiliary layer 007 is lower than initialization magnetic field 008 and higher than recording magnetic field 009. Further, at temperature b of low-output laser heating, the coercive force of auxiliary layer 007 is lower than initialization magnetic field 008 and higher than recording magnetic field 009, while the coercive force of recording layer 006 is lower than recording magnetic field 009. In addition, at temperature c of high-output laser heating, the coercive forces of auxiliary layer 007 and recording layer 006 are lower than recording magnetic field 009. The direction of magnetization of auxiliary layer 007 inverts at temperature a between room temperature and the low-output laser heating temperature.

In performing recording and erasure, first, the magneto-optical disc is rotated while impressing initialization magnetic field 008 at room temperature. Since the coercive force of auxiliary layer 007 is lower than the initialization magnetic field 008 at room temperature, only auxiliary layer 007 is magnetized in one direction by initialization magnetic field 008. The direction of the magnetic field generated by initialization magnetic field 008 is a direction that denotes recording. Since the coercive force of recording layer 006 is higher than initialization magnetic field 008 at room temperature, it is not magnetized.

Next, as shown in FIG. 26, when a low-output laser beam 011 is irradiated on the magneto-optical disc at the position of the recording magnetic field, recording layer 006 looses its magnetic field because its coercive force is lower than the recording magnetic field 009 at heating temperature b caused by the low-output laser beam 011. Then, recording layer 006 is magnetized when it cools. However, since the switched connection force between recording layer 006 and auxiliary layer 007 is stronger than recording magnetic field 009, the direction of magnetization of recording layer 006 becomes opposite to that of recording magnetic field 009. In other words, the direction of magnetization of recording layer 006 is not the direction that denotes recording, but rather it is the opposite direction that denotes erasure. Since the direction of inverted magnetic field 010 is opposite to that of recording magnetic field 009, recording layer 006 is more reliably magnetized in the direction that denotes erasure. Auxiliary layer 007 is not magnetized since its coercive force is higher than recording magnetic field 009 at low-output heating temperature b.

Next, when a high-output laser beam 012 is irradiated on the magneto-optical disc at the position of the recording magnetic field as shown in FIG. 27, recording layer 006 and auxiliary layer 007 loose their respective magnetic fields since their coercive forces are lower than recording magnetic field 009 at heating temperature c caused by high-output laser beam 012. When the disc cools, recording layer 006 is magnetized in a direction that denotes recording by recording magnetic field 009.

When the respective magnetic characteristics of the recording layer and the auxiliary layer are considered in the above system that uses a switched connection multilayer film, the initialization magnetic field requires a magnetic field strength of 2.5 to 7 kilooersteds to invert the direction of magnetization of the auxiliary layer and avoid any effect on the recording layer. Also, the inverted magnetic field should have a magnetic field strength of 1 to 2 kilooersteds to erase any unerased data and avoid any effect on the auxiliary layer.

However, since the magneto-optical disc is generally housed inside a cartridge, a magnetic field generation device is required to impress a magnetic field frown outside the cartridge in order to obtain the prescribed magnetic field strength on the surface of the magneto-optical disc, which increases the size of the magneto-optical recording/playback device itself. Also, the effect of leakage magnetic field around the magneto-optical recording/playback device causes problems.

Therefore, in order to suppress the leakage magnetic field as much as possible and configure the magneto-optical recording/playback device as small as possible, the magnetic head must be thin and have a dimension that allows it to enter the shutter (which can be freely opened and closed) provided on the cartridge when it is opened. For example, in the case of a disc diameter of 3.5 inches and a magneto-optical recording/playback device of 1 inch high, the magnetic head must be less than 7 mm high and 20 mm wide.

The configuration in FIG. 29 can be considered as an example in which the magnetic head is kept within that kind of range and the thickness of the magnet in the magnetic head is maximized. As shown, a magneto-optical disc 013 is housed inside a cartridge (not shown) such that it can rotate freely. The disc is rotated at the prescribed rpm by a motor (not shown). The cartridge has opposing windows which are provided with shutters (not shown) that can slide freely. In the figure, an optical head 014 and a magnetic head 015 enter the cartridge through the windows of the cartridge and oppose each other with magneto-optical disc 013 between them. Magnets 016 for initialization magnetic field that generate magnetic fields perpendicular to magneto-optical disc 013 are mounted on the right and left sides of magnetic head 015. In order to maximize the magnetic field strength of magnets 016 for initialization magnetic field, they are made the same thickness as magnetic head 015.

The magnetic field distribution generated by the magnetic head on the magneto-optical disc is shown in FIG. 30 with respect to the magnetic head position. As shown in the figure, the magnetic field is generated with left and right symmetry. While the recording magnetic field is sufficiently strong at the center position of optical head 014, the initialization magnetic field and the inverted magnetic field cannot be obtained with sufficient magnetic field strength.

To increase the initialization magnetic field, the use of a magnet for optical head movement that moves the optical head by electromagnetic force can be considered. An example is shown in FIG. 31. As shown in the figure, yokes 018 and 020 are disposed parallel to each other on the left and right sides of optical head 014 in the direction of movement of optical head 014 (i.e., the direction perpendicular to the paper surface). Magnets 019 for optical head movement are mounted outside yokes 020. Magnets 019 generate a magnetic field in a direction parallel to magneto-optical disc 013 and in a direction from the inside to the outside. Also, a coil 017 for optical head movement, which surrounds inside yokes 018, is attached to optical head 014. Therefore, coil 017 interlinks with the magnetic flux generated by magnets 019 between yokes 018 and 019. By energizing coil 017 and causing electromagnetic force to act on coil 017 and optical head 014, it is possible to move optical head 014 to a prescribed position.

In this example, since the magnetic field generated by initialization magnets 016 of the magnetic head and the magnetic field generated by magnets 019 for optical head movement strengthen each other as shown in FIG. 32, a stronger magnetic field than in the case of FIG. 30 can be obtained. However, the initialization magnetic field and the inverted magnetic field still cannot be obtained with sufficient strength.

Further, the addition of a magnet 021 for inverted magnetic field as shown in FIG. 33 can be considered for increasing the inverted magnetic field. As shown, a magnet 022 for initialization magnetic field and magnet 021 for inverted magnetic field are mounted on magnetic head 015. The magnetic field of magnet 021 is in a direction parallel to magnetic field of magnet 022, but the direction of the magnetic field of magnet 022 points down in the figure, while the direction of the magnetic field of magnet 021 points up in the figure.

In this example, the magnetic field distribution is generated asymmetrically as shown in FIG. 34. A sufficient magnitude is obtained for the inverted magnetic field. However, a sufficient magnetic field strength is not obtained for the recording magnetic field and the initialization magnetic field.

As described above, since the thickness and the width of the magnets are restricted in order to make the magnetic head thin and compact, sufficient magnetic field strengths cannot be obtained for the initialization magnetic field and the inverted magnetic field.

The invention is intended to solve this problem. Its purpose is to offer a magnetic field generation mechanism that generates an initialization magnetic field and a recording magnetic field capable of direct overwrite and facilitates the realization of a compact magneto-optical recording/playback device.

SUMMARY OF THE INVENTION

The invention is a magnetic field generation mechanism which combines a plurality of magnets for generating magnetic fields in different directions in a magneto-optical recording device. The recording device performs erasure together with recording in one rotation of the magneto-optical disc by irradiating on the magneto-optical disc made from a switched connection multi-layer film with a laser beam from an optical head. The recording device impresses a recording magnetic field perpendicular to the surface of the magneto-optical disc at the position of the optical head and an initialization magnetic field in the same direction as the recording magnetic field but stronger than the recording magnetic field while rotating the magneto-optical disc. By this means, the magnetic field generation mechanism can be made compact and thin, thus making the magneto-optical recording/playback device compact and thin.

Further, the invention is configured so that the biased magnet supported in the magnetic field generation mechanism can rotate freely. The direction of the biased magnetic field generated at the position opposite to the optical head can be varied. By providing a coil for biased magnetic field to change the direction of the magnetic field of the biased magnet by rotating the biased magnet through the exertion of an electromagnetic force on it, recording and erasure on magneto-optical discs other than the switched connection multi-layer film type are facilitated.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 4 is a cross section of the second embodiment of the invention;

FIG. 5 shows the magnetic field distribution in the second embodiment of the invention;

FIG. 6 is a cross section of the second embodiment of the invention with a magnetic support member;

FIG. 7 shows the magnetic field distribution in FIG. 6;

FIG. 11 is a cross section of the fourth embodiment of the invention;

FIG. 12 shows the magnetic field distribution in the fourth embodiment of the invention;

FIG. 14 is a cross section showing the inverted condition of the biased magnet pointing down in the figure in the fifth embodiment of the invention;

FIG. 15 shows the magnetic field distribution under the condition in FIG. 14;

FIG. 24 is an explanatory diagram of a prior art magneto-optical recording system which uses a magnetic field modulation system;

FIG. 25 is an explanatory diagram of a prior art magneto-optical recording system which uses a magnetic field modulation system;

FIG. 26 is an explanatory diagram of a magneto-optical recording system that uses a switched connection two-layer film system;

FIG. 27 is an explanatory diagram of a magneto-optical recording system that uses a switched connection two-layer film system;

DESCRIPTION OF THE PREFERRED EMBODIMENTS

Figure 1:
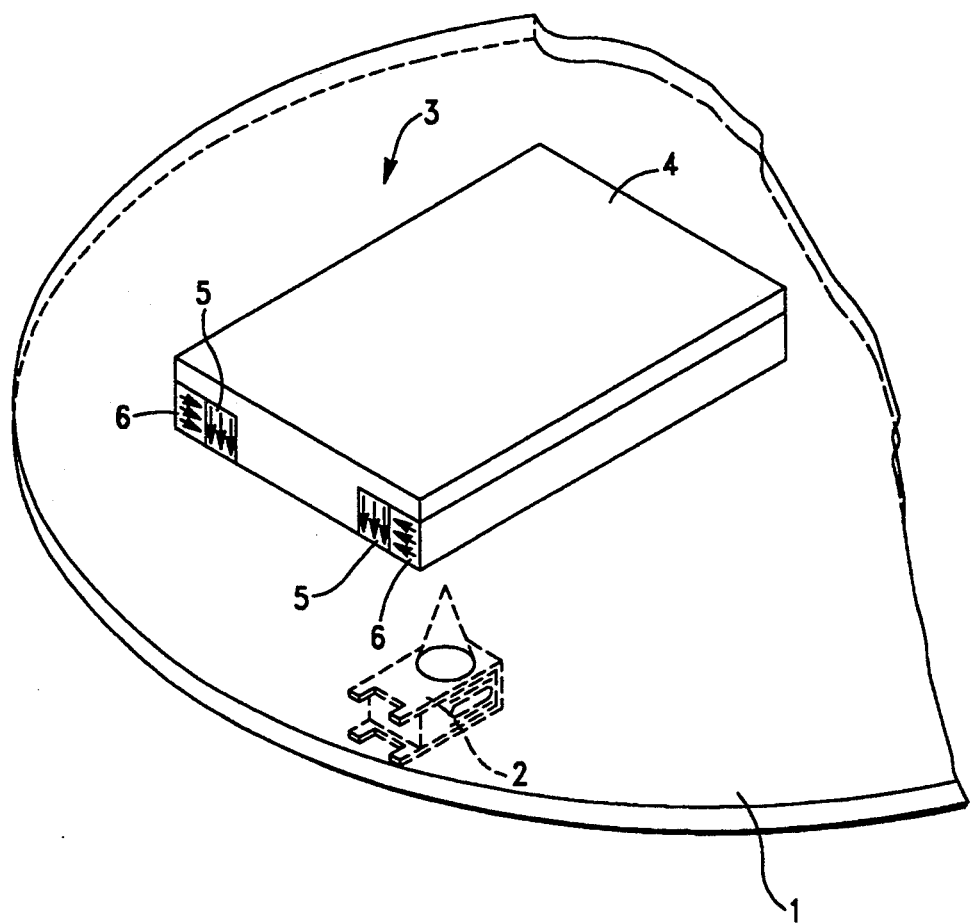
FIG. 1 is a perspective view showing the first embodiment of the invention.
Figure 2:
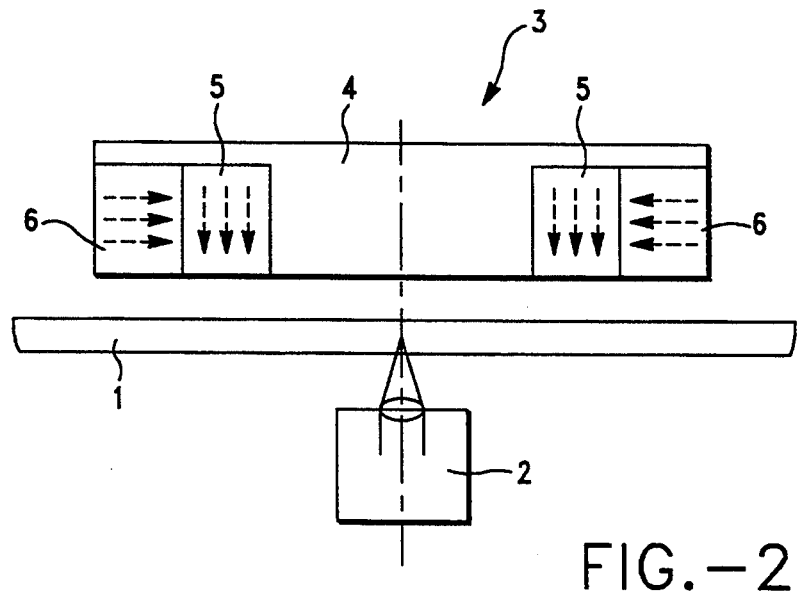
FIG. 2 is a cross section showing the first embodiment of the invention.

The first embodiment of the invention is shown in FIGS. 1 and 2. As shown in both figures, optical head 2 and magnetic head 3 oppose each other with magneto-optical disc 1 between them. Magneto-optical disc 1 is inserted inside a jacket (not shown) such that it can rotate freely at a fixed speed. Magneto-optical disc 1 in the embodiment uses a switched connection multilayer film capable of direct overwrite. Optical head 2 and magnetic head 3 enter the windows provided in the jacket. Optical head 2 is able to move in the radial direction of magneto-optical disc 1.

Magnetic head 3 is configured such that magnets 5 for a plurality of initialization magnetic fields and magnets 6 for amplification are mounted on a support member 4, which is a nonmagnetic member. Magnets 5 and magnets 6 are each disposed so that they have left-right symmetry with respect to the direction of movement of optical head 2. Magnets 6 are disposed outside magnets 5. Magnets 5 generate magnetic fields in a direction perpendicular to magneto-optical disc 1 and pointing downward in the figure. Magnets 6 generate magnetic fields in a direction parallel to magneto-optical disc i 5 and pointing in a direction from the outside to the inside. The magnetic field synthesized by the magnetic fields of magnets 5 and the magnetic fields of magnets 6 is impressed on magneto-optical disc 1.

By mounting magnets 5 and magnets 6, which generate magnetic fields in different directions on magnetic head 3, the same effect is obtained as when the thickness of magnets 5 is increased. Therefore, the magnetic field strength of the initialization magnetic field can be amplified on both sides of optical head 2.

Further, instead of using a dedicated magnet for recording magnetic field, the recording magnetic field is formed at the position of optical head 2 by combining the magnetic fields of magnet 5 and magnet 6 together.

Also, since the recording magnetic field is a composite of the magnetic fields generated by left and right magnets 5, its distribution spreads out on the graph. Therefore, when magnetic head 3 is mounted in a magneto-optical recording/playback device, magnetic head 3 and optical head 2 can be positioned within a wide range, thus simplifying assembly of magnetic head 3 in the magneto-optical recording/playback device.

Further, the inverted magnetic field on both sides of the initialization magnetic field is created on the return pass of the initialization magnetic field. Since the inverted magnetic field is positioned on both sides of the initialization magnetic field and the recording magnetic field, the data on magneto-optical disc 1 can be erased with greater reliability. However, the inverted magnetic field is not necessarily required.

Figure 3:
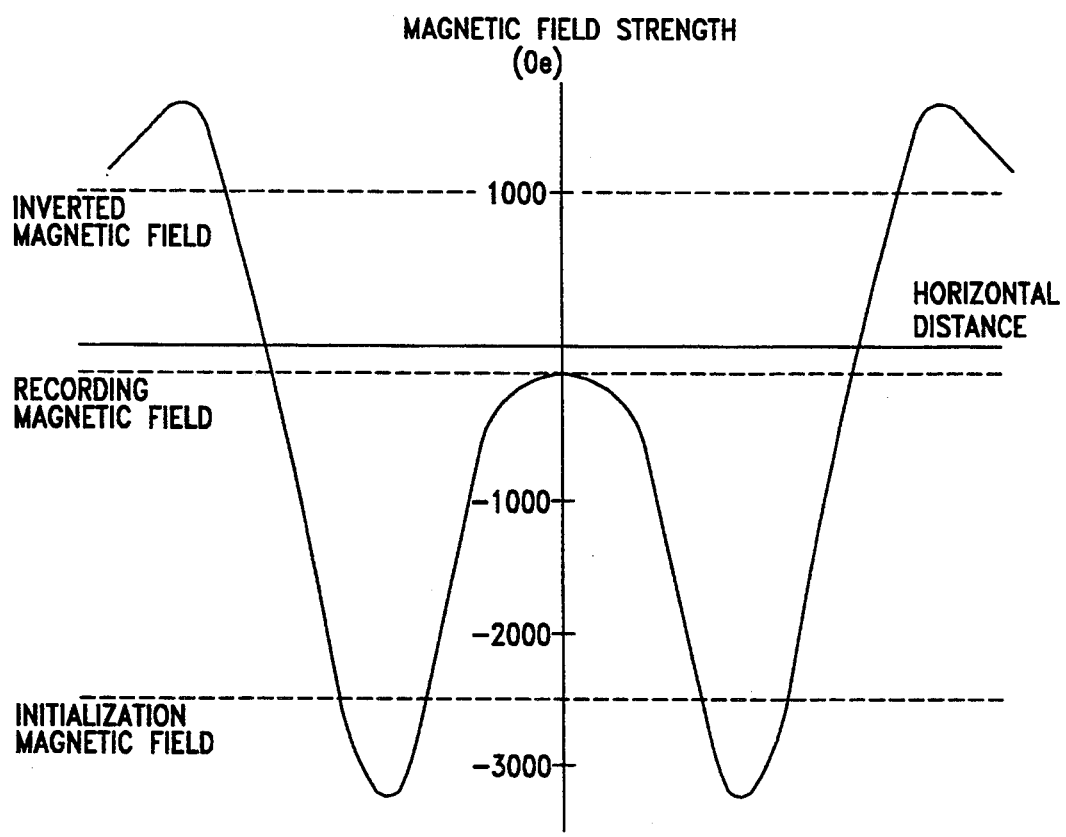
FIG. 3 shows the magnetic field distribution in the first embodiment of the invention.

The magnetic field distribution in the recording layer at the position corresponding to magnetic head 3 of the above configuration is shown in FIG. 3. As shown, the magnetic field distribution is symmetrical about optical head 2. It is possible to make the recording magnetic field at the position of optical head 2 less than 1 kilooersted, the initialization magnetic field on both sides of that 2.5 kilooersteds and the inverted magnetic field on both sides of that 1 kilooersted.

Therefore, the initialization magnetic field, the inverted magnetic field and the recording magnetic field can all be obtained with the necessary magnetic field strength for direct overwrite, thus facilitating simultaneous erasure at the time of recording in one rotation of magneto-optical disc 1.

Further, since the initialization magnetic field can be increased without increasing the thickness of magnets 5, the height of magnetic head 3 can be kept within 7 mm and its width within 20 mm, thus making it possible to configure a 1-inch high magneto-optical recording/playback device capable of direct overwrite on 3.5-inch diameter discs. A half-height (41.3 mm thick) or smaller magneto-optical recording/playback device capable of direct overwrite on 5.25-inch diameter discs can also be realized.

The shape of support member 4 is not particularly restricted. In this embodiment, support member 4 is a nonmagnetic member, but if a magnetic body is used, the magnetic field distribution necessary for direct overwrite can be obtained by changing its shape.

The second embodiment of the invention is shown in FIG. 4. In this embodiment, the initialization magnetic field, etc., are amplified by utilizing the magnetic field of a magnet for optical head movement of the optical head. A magnetic head 3 is configured such that magnets 5 for initialization magnetic field and magnets 6 for amplification are mounted on a support member 4, which is a nonmagnetic member. Magnets 5 and magnets 6 are disposed with right-left symmetry about an optical head 2. Magnets 5 and magnets 6 are the same as in the first embodiment.

Yokes 8 and 10 are disposed parallel to each other on the left and right sides of the optical head in the direction of movement of optical head 2, (i.e., the direction perpendicular to the paper surface). Magnets 9 for optical head movement are mounted on outside yokes 10. Magnets 9 generate magnetic fields in a direction parallel to a magneto-optical disc I and in a direction from the inside to the outside. Also, a coil 7 for optical head movement, which surrounds inside yokes 8, is attached to optical head 2. Therefore, coil 7 interlinks with the magnetic flux generated by magnets 9 between yokes 8 and 10. By energizing coil 7 and causing electromagnetic force to act on coil 7 and the optical head, optical head 2 can be moved to a prescribed position.

Since the magnetic fields generated by magnets 5 and magnets 9 strengthen each other, magnets 5 and magnets 6 can be made even smaller than in the first embodiment. As shown in FIG. 5, the initialization magnetic field, the inverted magnetic field and the recording magnetic field can be obtained with the strength necessary for overwrite.

In this embodiment, a recording magnetic field can be generated with a flat, broad distribution while the initialization magnetic field strength is also increased by disposing magnets 6 in the same manner as in the first embodiment.

Support member 8 is a nonmagnetic member in this embodiment, but even if it is a magnetic member, the magnetic field distribution necessary for overwrite can be obtained by changing its shape. For example, FIGS. 6 and 7 respectively show the configuration of a magnetic head 3a which uses a magnetic support member 4a and its magnetic field distribution. As shown in FIG. 7, the magnetic field distribution differs slightly from that in FIG. 5, but the initialization magnetic field, the inverted magnetic field and the recording magnetic field can all be obtained with sufficient strength for overwrite.

Figure 8:
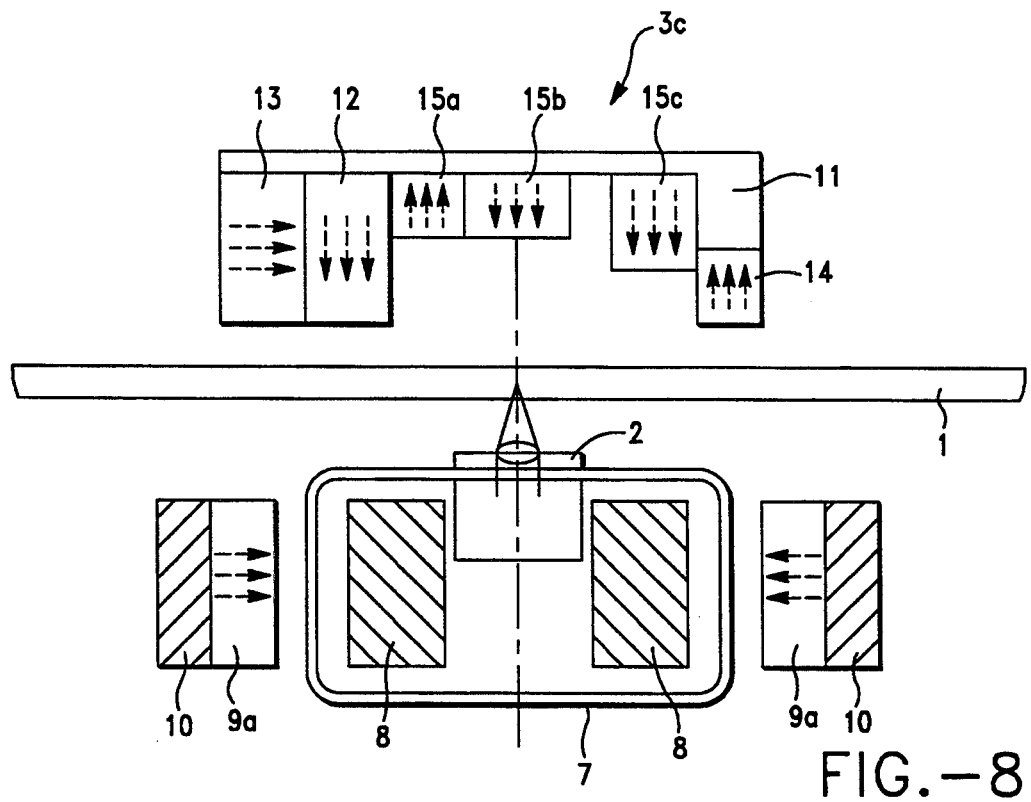
FIG. 8 is a cross section of the third embodiment of the invention.

FIG. 8 shows the third embodiment of the invention. This embodiment forms an asymmetrical magnetic field distribution. As shown, a magnetic head 3c and an optical head 2 oppose each other with a magneto-optical disc 1 between them. Magnetic head 3c and optical head 2 enter the windows in the jacket (not shown) which houses magneto-optical disc 1. Magnetic head 3c is configured such that, in addition to a magnet 12 for initialization magnetic field and a magnet 13 for amplification, magnets 15a, 15b and 15c for adjustment are mounted on a support member 11, which is a nonmagnetic member. Magnets 12 to 15c are disposed asymmetrically with respect to optical head 2.

The directions of the magnetic fields of magnets 15a, 15b and 15c are all perpendicular to magneto-optical disc 1. Magnet 15b is positioned in the center of optical head 2 and the direction of its magnetic field points down. Magnet 15c is positioned to the right and the direction of its magnetic field points down. Magnet 15a is positioned to the left and the direction of its magnetic field points up. A magnet 14 for inverted magnetic field is positioned on the fight side of magnet 15c and the direction of its magnetic field points up and is perpendicular to magneto-optical disc 1. Magnet 12 and magnet 13 are positioned to the left of magnet 15c and the directions of their magnetic fields are the same as in the first embodiment. Yokes 8 and 10 are disposed parallel to each other on the left and right sides of optical head 2 in the direction of movement of optical head 2, (i.e., the direction perpendicular to paper surface). Magnets 9a for optical head movement are mounted on outside yokes 10. Magnets 9a generate magnetic fields in a direction parallel to magneto-optical disc 1 from the outside to the inside. Also, a coil 7 for optical head movement, which surrounds inside yokes 8, is attached to optical head 2. Therefore, coil 7 interlinks with the magnetic flux generated by magnets 9a between yokes 8 and 10. By energizing coil 7 and causing electromagnetic force to act on coil 7 and optical head 2, it is possible to move optical head 2 to a prescribed position.

Figure 9:
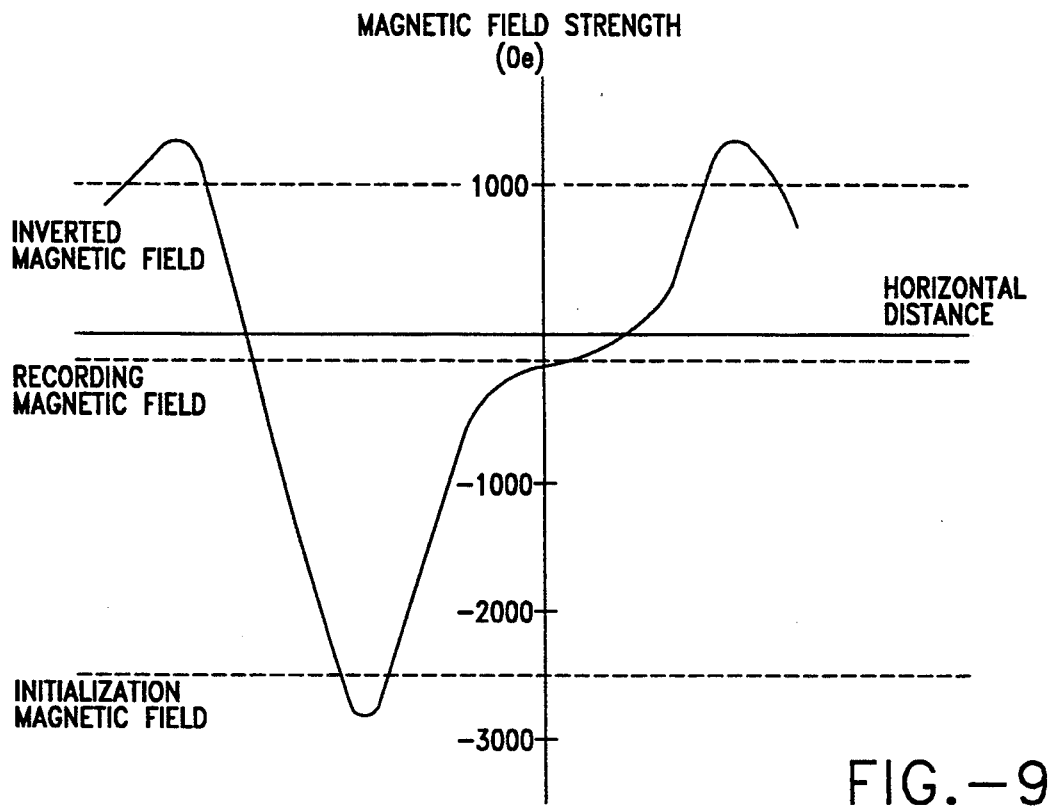
FIG. 9 shows the magnetic field distribution in the third embodiment of the invention.

In this embodiment, coil 7, magnets 9a and yokes 8 and 10 are disposed with left-right symmetry with respect to the forward direction of the optical head 2, but the magnets 12 to 15c in the magnetic head 3c are disposed asymmetrically. Therefore, as shown in FIG. 9, the magnetic field distribution is asymmetrical to the left and right of optical head 2. However, it is possible to make the recording magnetic field at the position of optical head 2 less than 1 kilooersted, the initialization magnetic field on the left side in the figure 2.5 kilooersteds and the inverted magnetic field on the right side in the figure and on the left side of the recording magnetic field 1 kilooersted.

Therefore, in this embodiment the initialization magnetic field, the inverted magnetic field and the recording magnetic field can be obtained with the necessary strength for overwrite, thus facilitating erasure simultaneously with recording on magneto-optical disc 1.

Figure 10:
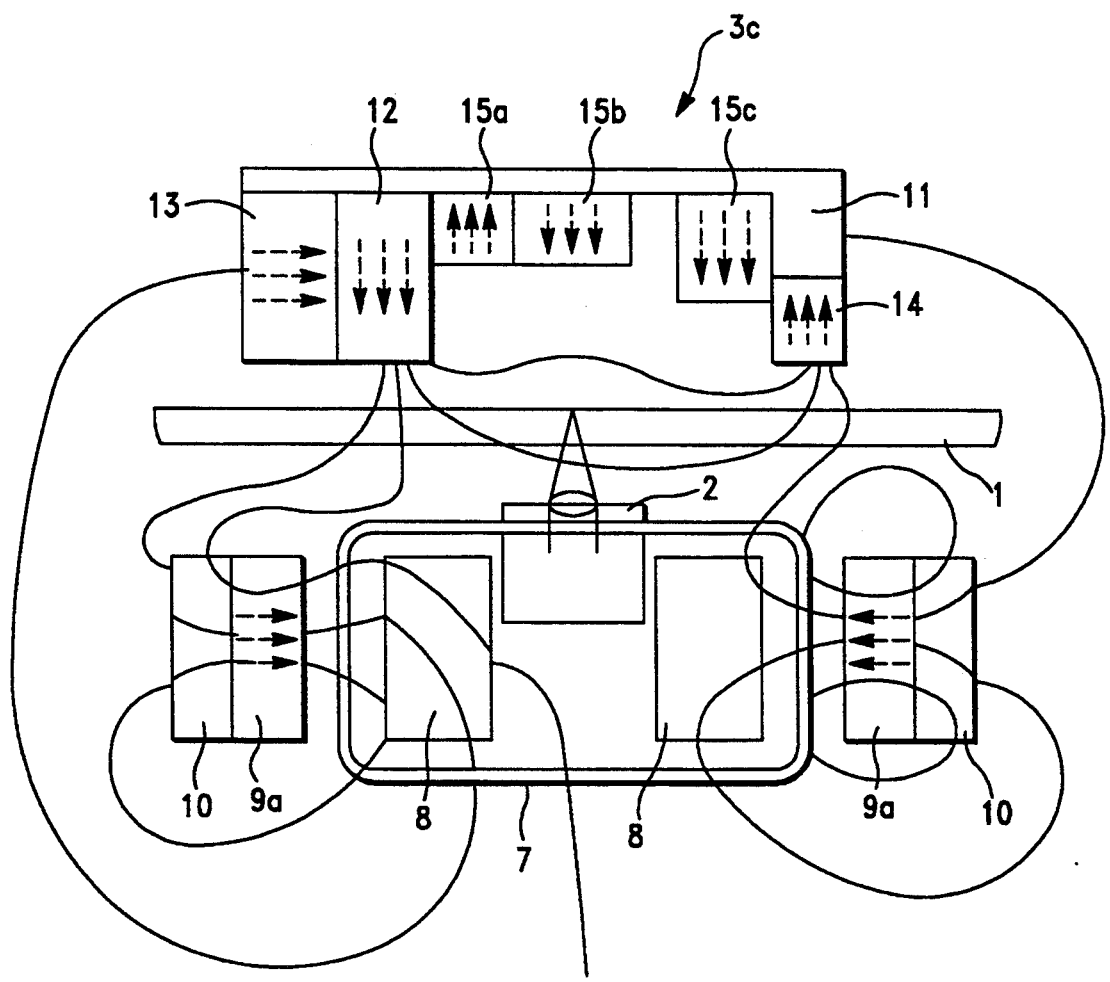
FIG. 10 is a distribution graph of magnetic flux in the third embodiment of the invention.
Figure 13:
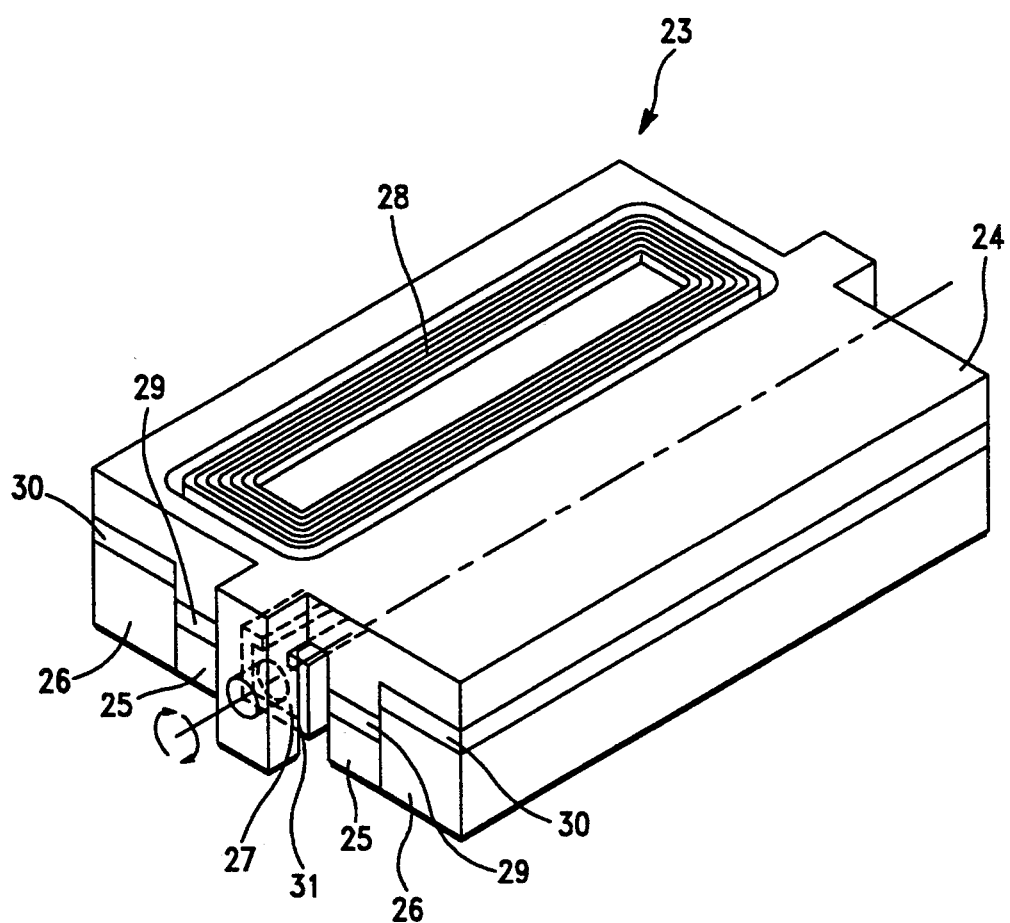
FIG. 13 is a perspective view of the fifth embodiment of the invention.

When the magnetic field distribution is made asymmetrical to the left and right of optical head 2, the magnetic field distribution between coil 7 for left-right optical head movement (which drives optical head 2 by electromagnetic force) and magnets 9a is also asymmetrical to the left and right as shown in FIG. 10. For this reason, in order to make the electromagnetic force generated by coil 7 uniform and stably move optical head 2, separate coils 7 should be made for the left and right sides respectively and the power that energizes the respective coils should be adjusted.

Also, as in the first embodiment, the shape of support member 11 used in this embodiment is not restricted. Since support member 11 is also not limited to a nonmagnetic member, the necessary magnetic field distribution for overwrite can be obtained by changing its shape.

FIG. 11 shows the fourth embodiment of the invention. This embodiment, like the third embodiment, forms an asymmetrical magnetic field distribution. A magnetic head 3d is configured such that a magnet 12 for initialization magnetic field, a magnet 13 for amplification and a magnet 14 for inverted magnetic field are mounted on a support member 16, which is a nonmagnetic member. Magnets 12 to 14 are disposed such that they are positioned asymmetrically with respect to an optical head (not shown). Magnet 14 is positioned on the right side of support member 16. Magnet 12 and magnet 13 are positioned on the left side of support member 16. The directions of these magnetic fields are the same as in the third embodiment.

Since magnets 12 to 14 are disposed asymmetrically in magnetic head 3d in this embodiment, the magnetic field distribution is asymmetrical to the left and right of the optical head as shown in FIG. 12. However, it is possible to make the recording magnetic field at the position of the optical head less than 1 kilooersted, the initialization magnetic field on the left side in the figure 2.5 kilooersteds and the inverted magnetic field on the right side in the figure and on the left side of the recording magnetic field 1 kilooersted.

Therefore, in this embodiment, the initialization magnetic field, the inverted magnetic field and the recording magnetic field can be obtained with the necessary strength for overwrite, thus facilitating erasure simultaneously with recording on magneto-optical disc 1.

Figure 16:
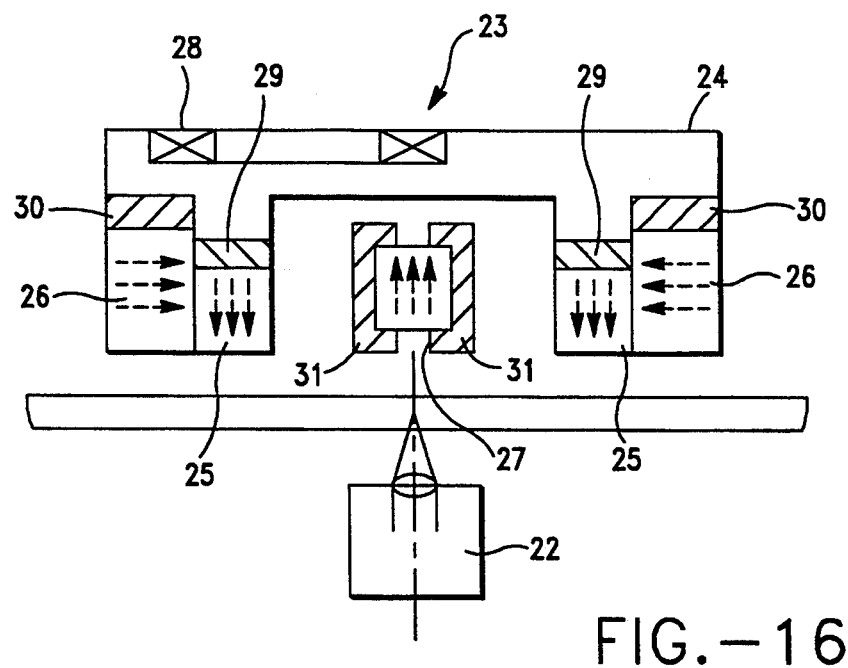
FIG. 16 is a cross section showing the inverted condition of the biased magnet pointing up in the figure in the fifth embodiment of the invention.

The fifth embodiment of the invention is shown in FIGS. 13 to 17. This embodiment is configured by adding a biased magnet 27. As shown in FIG. 14, an optical head 22 and a magnetic head 23 are disposed opposite to each other with a magneto-optical disc 21 between them. Optical head 22 and magnetic head 23 enter the windows of the jacket (not shown) that houses magneto-optical disc 21. Magnetic head 23 is configured such that magnets 25 for a plurality of initialization magnetic fields, magnets 26 for amplification, biased magnet 27 and a coil 28 for biased magnetic field are mounted on a support member 24, which is a nonmagnetic member. Magnets 25 and magnets 26 are disposed with right-left symmetry with respect to the direction of movement of optical head 22, and the directions of these magnetic fields are the same as in the first embodiment. Yokes 29 and 30 are inserted between magnets 25 and support member 24 and between magnets 26 and support member 24, respectively. Biased magnet 27 is supported such that it can rotate freely within a prescribed angle at the center position of optical head 22. Yokes 31 are mounted on both sides of biased magnet 27. A coil 28 for biased magnetic field is disposed on the top surface of support member 24 such that it causes a prescribed electromagnetic force to act on biased magnet 27. Therefore, biased magnet 27 can be rotated within a prescribed angle as indicated by the arrows in FIG. 13 by the electromagnetic force generated by energizing coil 28. By this means, the magnetic field distribution on the surface of magneto-optical disc 21 can be controlled by inverting the directions of the magnetic field of biased magnet 27 by rotating biased magnet 27 as shown in FIGS. 14 and 16.

Here, the direction of the magnetic field of biased magnet 27 is shown in FIG. 14 pointing perpendicularly down. The magnetic field distribution on magneto-optical disc 21 corresponding to the position of magnetic head 23 under this condition is shown in FIG. 15. As shown in this embodiment, the initialization magnetic field, the inverted magnetic field and the recording magnetic field can all be obtained with sufficient strength for direct overwrite. Therefore, by using a switched connection multilayer film capable of direct overwrite as magneto-optical disc 21 in this invention, it is possible to perform erasure at the same time as recording in one rotation of magneto-optical disc 21.

Here, magneto-optical disc 21 is not limited to switched connection two-layer film capable of direct overwrite. The prior art rewritable magneto-optical discs used in FIGS. 24 and 25 can also be used.

Figure 17:
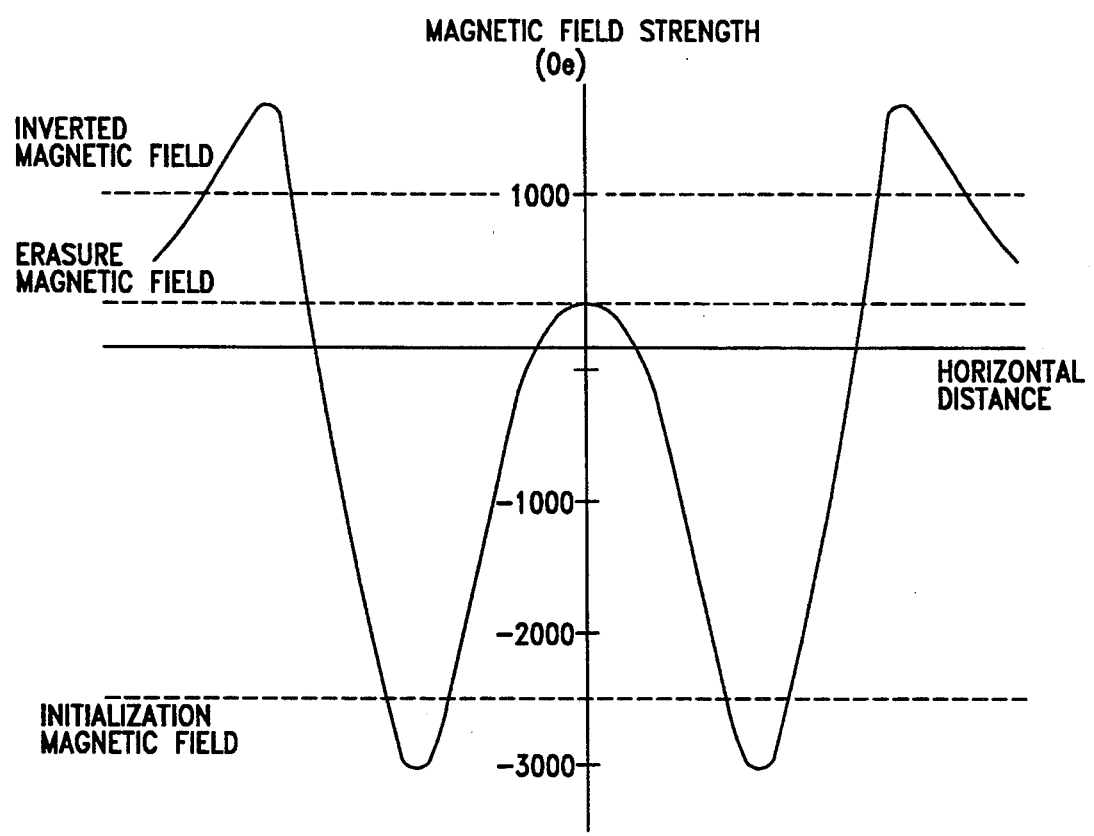
FIG. 17 shows the magnetic field distribution under the condition in FIG. 16.
Figure 18:
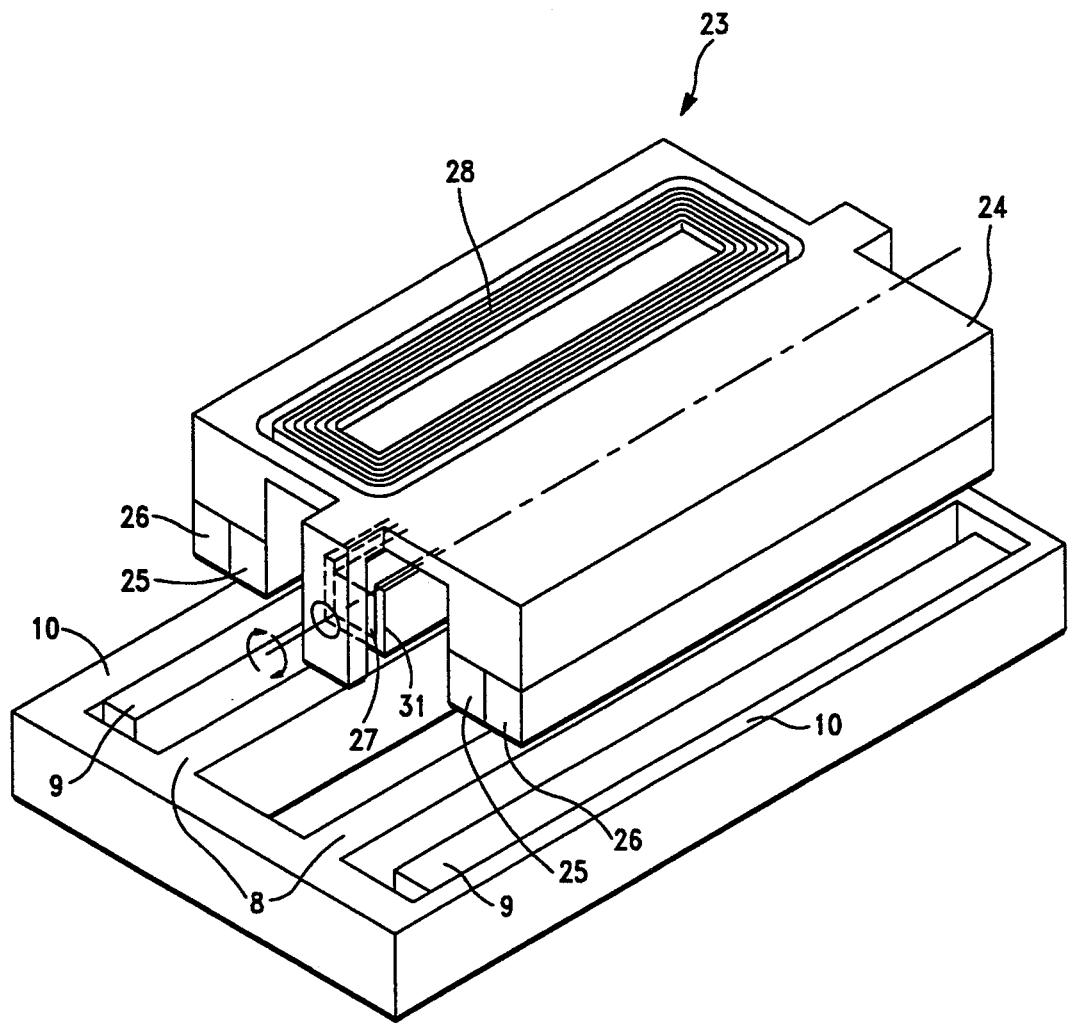
FIG. 18 is a perspective view of the sixth embodiment of the invention.

In other words, since the magnetic field strength necessary for recording on prior art rewritable magneto-optical discs is the same as that for switched connection two-layer films, it is possible to record data on a prior art rewritable magneto-optical disc 21. Also, as shown in FIG. 17, when the magnetic field of biased magnet 27 is inverted, the recording magnetic field and the erasure magnetic field in the opposite direction are generated at the center position of optical head 22, and the erasure of data from magneto-optical disc 21 by this erasure magnetic field becomes possible. FIG. 17 is a graph of the magnetic field distribution on magneto-optical disc 21 corresponding to the position of magnetic head 23 under a condition as shown in FIG. 16 in which the direction of the magnetic field of biased magnet 27 is pointing up perpendicularly.

Since the coercive force of prior art rewritable magneto-optical discs is greater than 10 kilooersteds at room temperature, they are not affected by the initialization magnetic field or the recording magnetic field.

The sixth embodiment of the invention is shown in FIGS. 18 to 22. This embodiment utilizes the magnetic field of a magnet 9 for optical head movement of an optical head 22 to amplify the initialization magnetic field, etc. Optical head 22 and magnetic head 23 are disposed opposite to each other with a magneto-optical disc 21 between them. Optical head 22 and magnetic head 23 enter the windows of the jacket (not shown) that houses magneto-optical disc 21. Magnetic head 23 is configured such that magnets 25 for a plurality of initialization magnetic fields, magnets 26 for amplification, a biased magnet 27 and a coil 28 for biased magnetic field are mounted on a support member 24, which is a nonmagnetic member. This is nearly the same configuration as in the fifth embodiment. Yokes 8 and 10 for moving optical head 22 and magnets 9 for optical head movement are configured nearly the same as in the second embodiment. Therefore, it is possible to cause an electromagnetic force to act on optical head 22 by energizing a coil 7 for optical head movement and thereby move it to a prescribed position.

Figure 22:
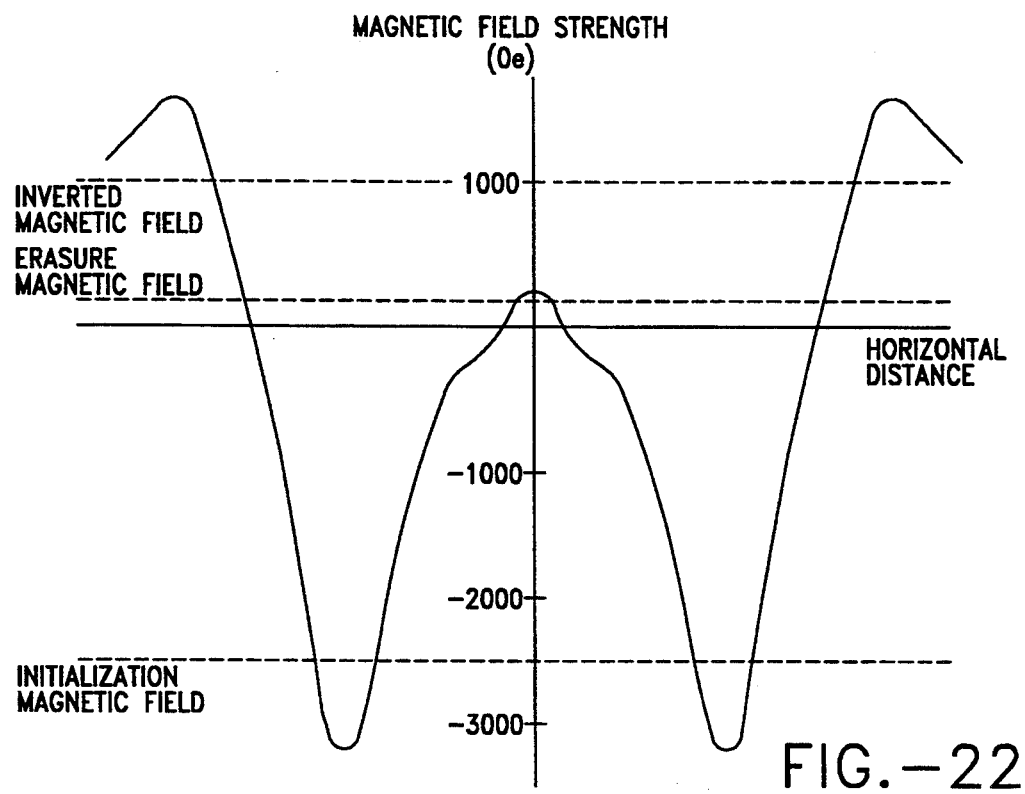
FIG. 22 shows the magnetic field distribution under the condition in FIG. 21.

Here, since the magnetic fields generated by magnets 25 of magnetic head 23 and magnet 9 strengthen each other, the initialization magnetic field, inverted magnetic field and recording magnetic field can all be obtained with sufficient magnetic field strength for overwrite as shown in FIG. 22 even if magnets 25 and magnets 26 are made smaller than in the fifth embodiment.

Figure 19:
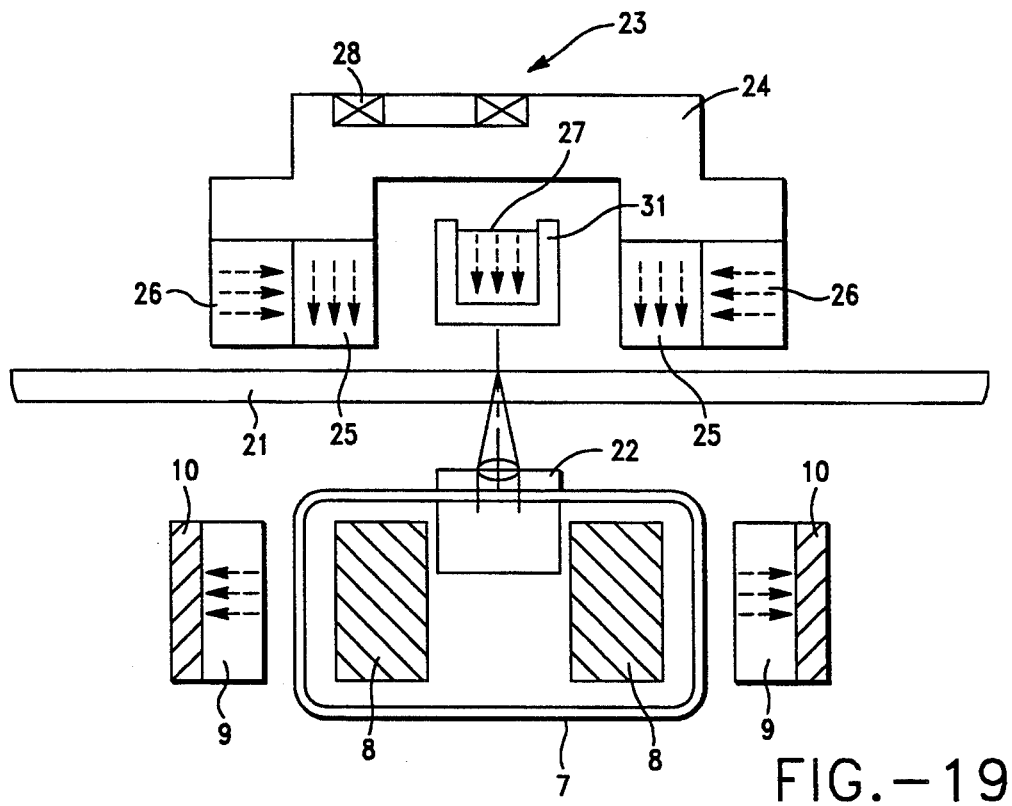
FIG. 19 is a cross section showing the inverted condition of the biased magnet pointing down in the figure in the sixth embodiment of the invention.
Figure 20:
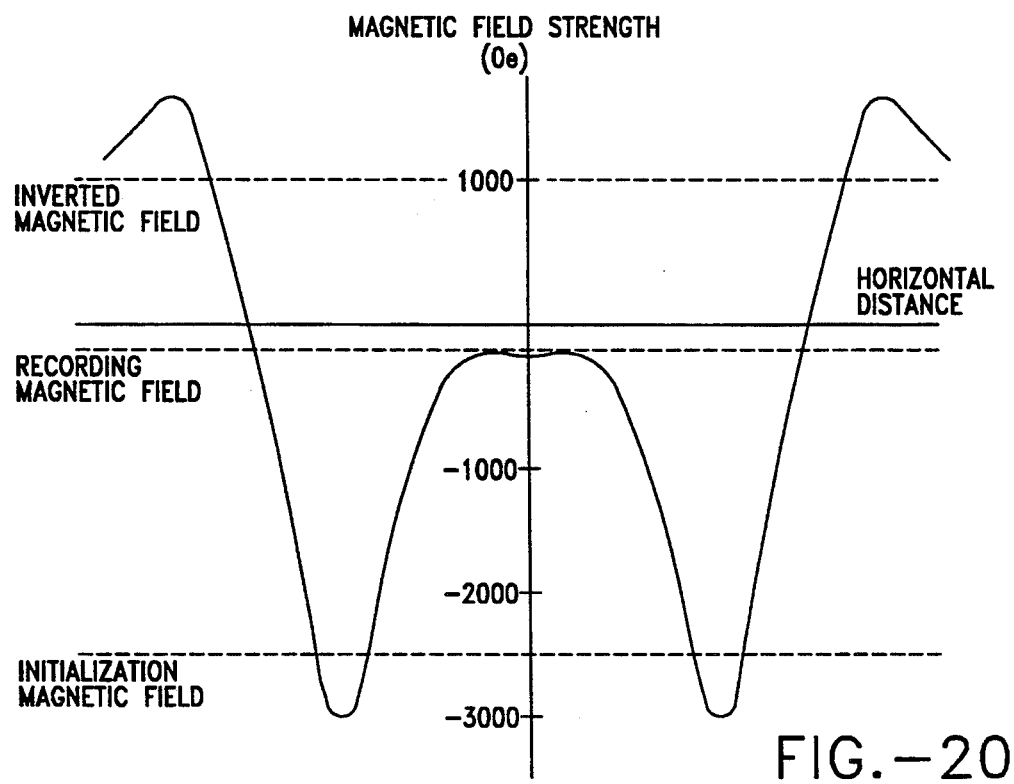
FIG. 20 shows the magnetic field distribution under the condition in FIG. 19.
Figure 21:
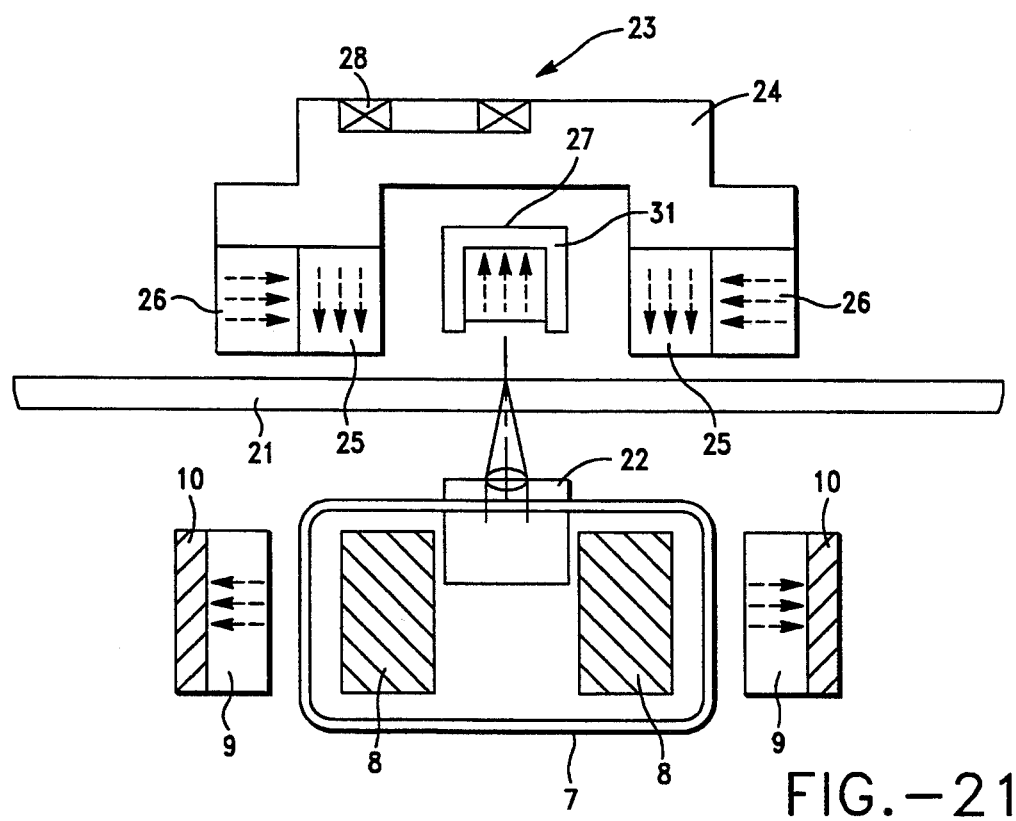
FIG. 21 is a cross section showing the inverted condition of the biased magnet pointing up in the figure in the sixth embodiment of the invention.

Further, by energizing coil 28 and rotating biased magnet 27 as shown in FIGS. 19 and 21 to rotate the magnetic field, it is possible to control the magnetic field distribution on magneto-optical disc 21 as shown in FIGS. 20 and 22. Therefore, as in the fifth embodiment, the initialization magnetic field, inverted magnetic field and recording magnetic field necessary for direct overwrite can all be obtained in this embodiment. Also, it is possible to perform recording and erasure using, in addition to switched connection two-layer film, magneto-optical discs 21 of magnetic field modulation type that do not allow direct overwrite.

Figure 23:
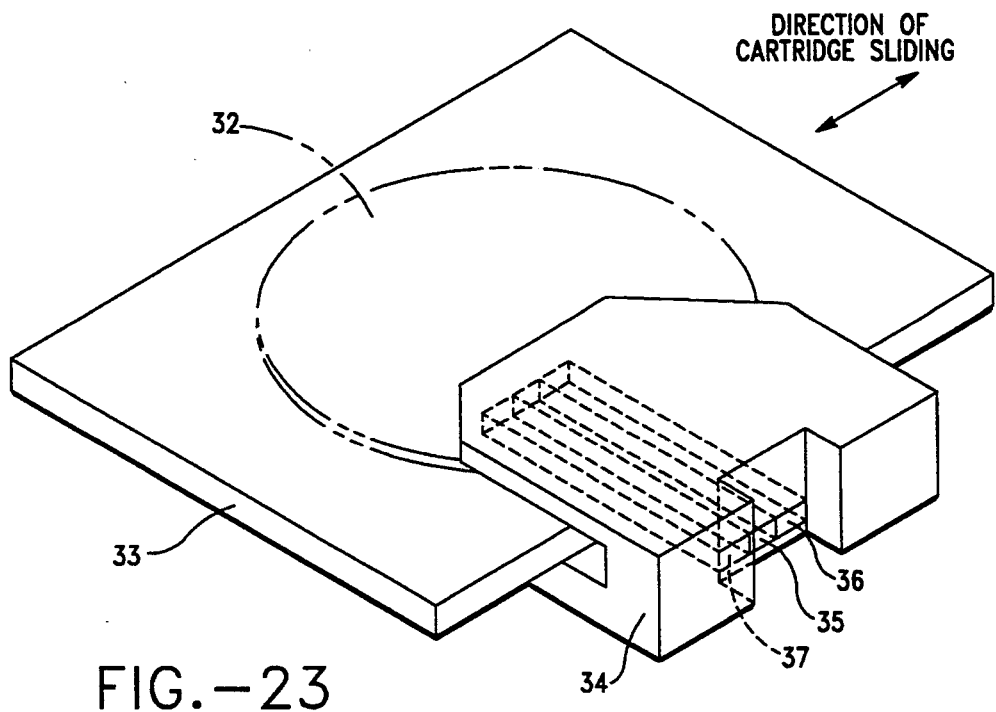
FIG. 23 is a perspective view of the seventh embodiment of the invention.
Figure 28:
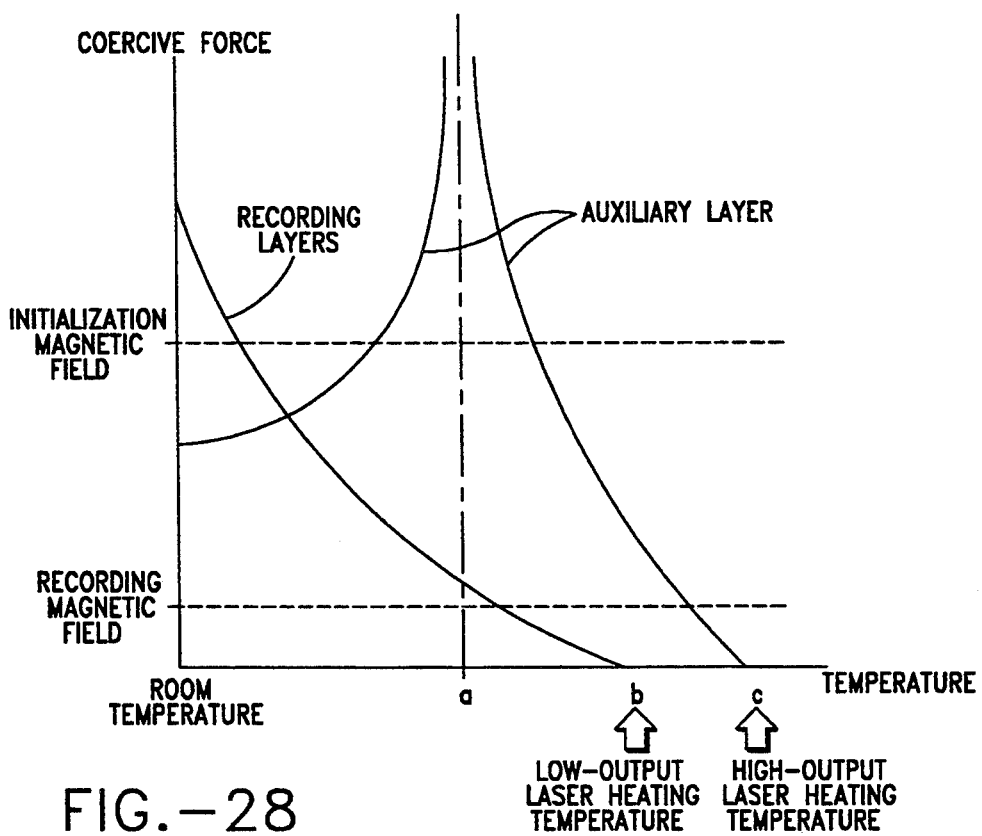
FIG. 28 shows the temperature characteristics of the coercive force of the recording layer and auxiliary layer in the switched connection two-layer film system.
Figure 29:
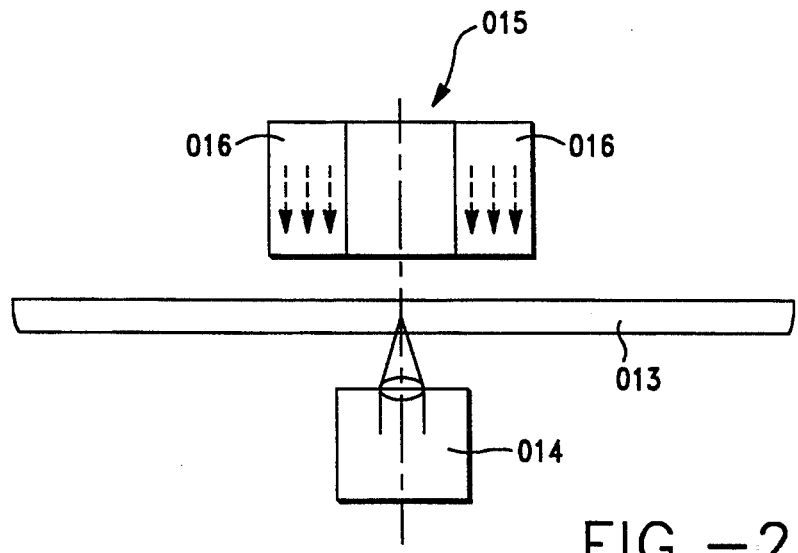
FIG. 29 is a cross section showing a magnetic head in which the magnet for initialization magnetic field is at maximum thickness.
Figure 30:
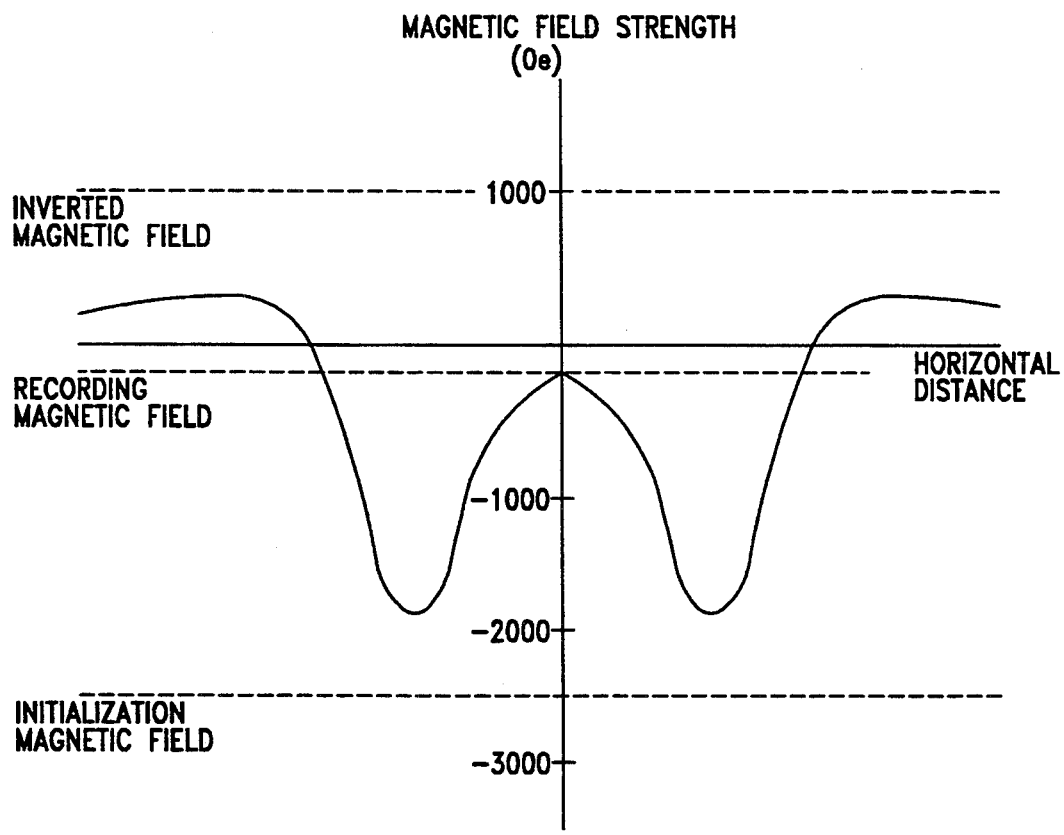
FIG. 30 shows the magnetic field distribution in FIG. 29.
Figure 31:
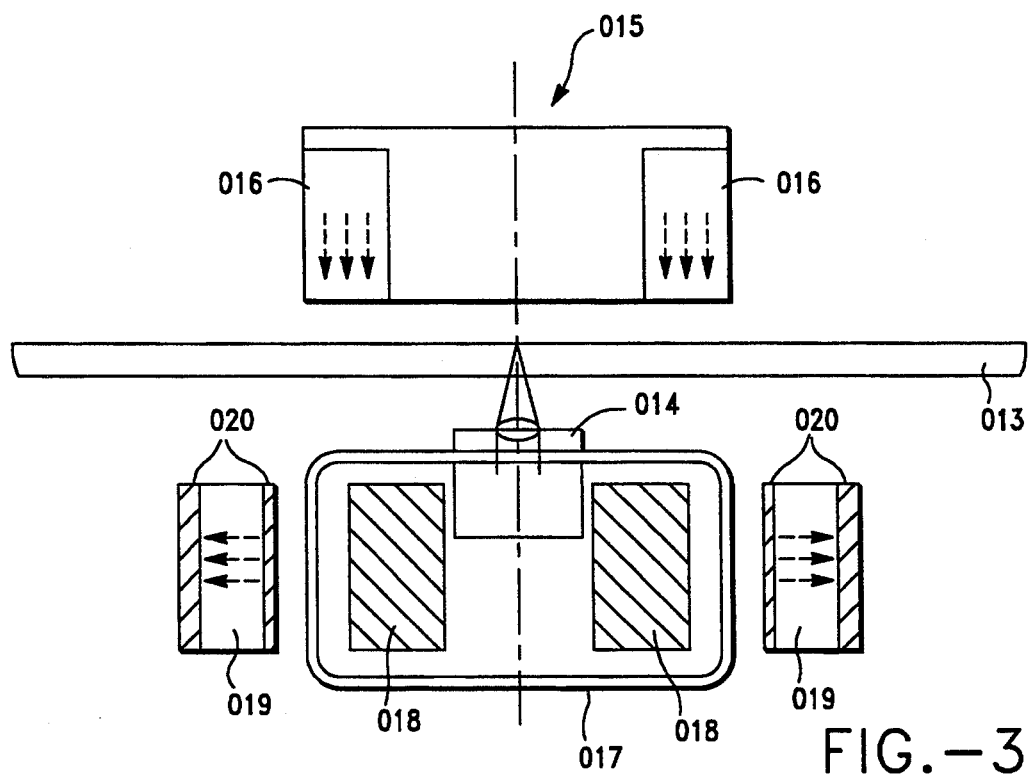
FIG. 31 is a cross section showing an example in which the initialization magnetic field is amplified by utilizing the magnet for optical head movement.
Figure 32:
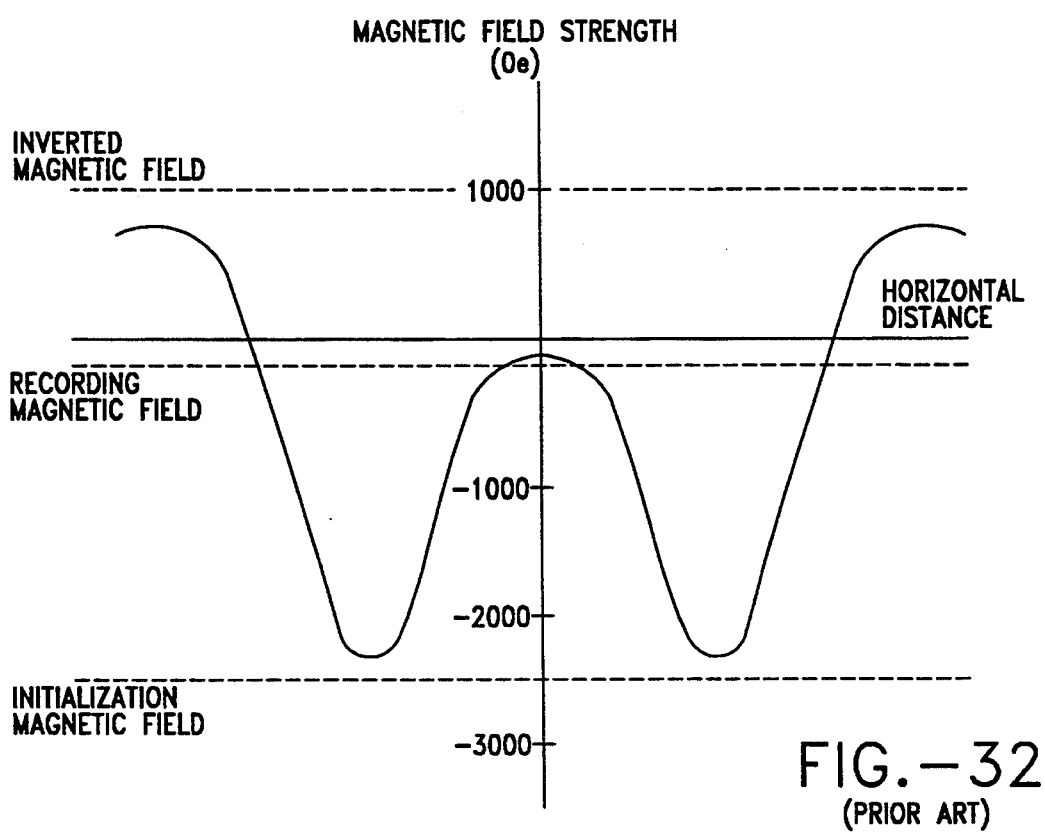
FIG. 32 shows the magnetic field distribution in FIG. 31.
Figure 33:
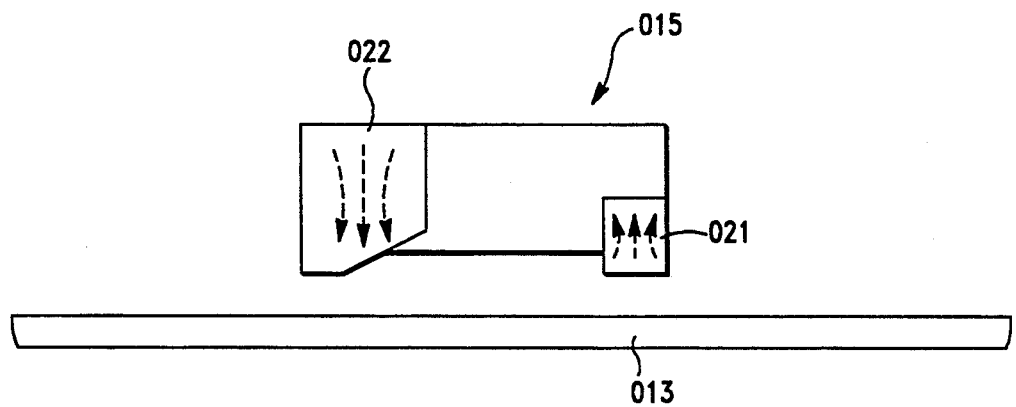
FIG. 33 is a cross section showing the magnetic head which uses a magnet for inverted magnetic field.
Figure 34:
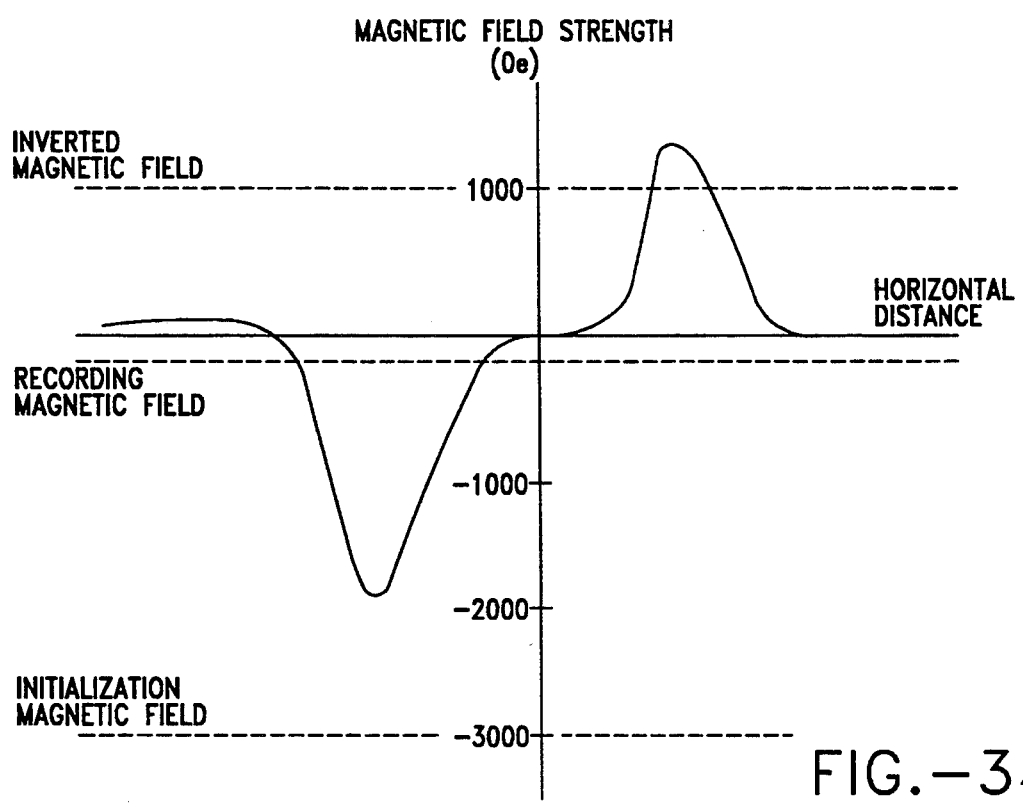
FIG. 34 shows the magnetic field distribution in FIG. 33.

The seventh embodiment of the invention is shown in FIG. 23. This embodiment facilitates the impression of an initialization magnetic field from outside a cartridge 33 that houses a magneto-optical disc 32. A yoke 34 is used that fits over the top and bottom of cartridge 33. Cartridge 33 is loaded by sliding it into yoke 34. A magnet 35 for initialization magnetic field and magnets 36 and 37 for amplification on both sides of magnet 35 are mounted on yoke 34. The directions of the magnetic fields of magnet 35 and magnets 36 and 37 are the same as in the first embodiment. Therefore, the auxiliary layer of the switched connection two-layer film used as magneto-optical disc 32 can be initialized at room temperature by the initialization magnetic field applied by magnet 35 and magnets 36 and 37.

Since magnets 35, etc., are disposed on yoke 34 isolated from the magnetic head in this embodiment, the magnetic head can be made more compact. Also, when erasing and writing the recording layer, a recording magnetic field from the optical head and magnetic head (not shown) should be impressed and a low-output laser and a high-output laser should be irradiated on the magneto-optical disc.

As described above, the magnetic field generation mechanism of the invention is useful as a magnetic field generation device for use in magneto-optical recording/playback devices that record and play back using magneto-optical discs made from switched connection multilayer films capable of direct overwrite. The mechanism is also useful as a magnetic field generation device for use in magneto-optical recording/playback devices that record and play back using magneto-optical discs other than switched connection multilayer film types. It is particularly useful in making magneto-optical recording/playback devices more compact and thinner.

While the invention has been described in conjunction with several specific embodiments, it is evident to those skilled in the art that many further alternatives, modifications and variations will be apparent in light of the forgoing description. Thus, the invention described herein is intended to embrace all such alternatives, modifications, applications and variations as may fall within the spirit and scope of the appended claims.

What is claimed is:

1. In a magneto-optical recording device that performs recording and erasure on a rotating magneto-optical disc by irradiating the rotating magneto-optical disc with a laser beam from an optical head and impressing a recording magnetic field perpendicular to the surface of the magneto-optical disc at the position of the optical head and an initialization magnetic field in the same direction as the recording magnetic field and stronger than the recording magnetic field, a magnetic field generation mechanism for magneto-optical recording comprising a plurality of magnets for generating the above magnetic fields; wherein the plurality of magnets are configured such that a first magnet for initialization generates a magnetic field in the same direction as the recording magnetic field, a second magnet for amplification generates a magnetic field in a direction perpendicular to the recording magnetic field and the initialization magnetic field, and a third magnet for biasing generates a magnetic field of a variable the direction at the position opposite to the optical head and is freely rotatable; wherein the plurality of magnets are disposed symmetrically or asymmetrically to the left and fight of the optical head.

2. The magnetic field generation mechanism of claim 1 further comprising a coil for changing the direction of the magnetic field of the third magnet by rotating the third magnet through the exertion of an electromagnetic force.

3. In a magneto-optical recording device that includes a magnetic head having a support member and an optical head and that performs erasure and recording on a magneto-optical disc, a magnetic field generation mechanism for magneto-optical recording comprising:

first means, mounted on the support member, for generating initialization magnetic fields perpendicular to a surface of the disc on each side of the optical head; and second means, mounted on the support member, for generating amplification magnetic fields parallel to the disc surface for amplifying the initialization magnetic fields such that a synthesized magnetic field is produced and is impressed on the disc as a recording magnetic field at the position of the optical head.

4. The magnetic field generation mechanism of claim 3 wherein the initialization magnetic fields point toward the disc and the amplification magnetic fields point in a direction facing the optical head.

5. The magnetic field generation mechanism of claim 4 wherein said first means includes first and second magnets disposed symmetrically relative to the direction of movement of the optical head and said second means includes third and fourth magnets disposed symmetrically relative to the direction of movement of the optical head and surrounding said first and second magnets, respectively.

6. The magnetic field generation mechanism of claim 3 wherein the initialization magnetic fields are greater than 2.5 kilooersteds and the recording magnetic field at the position of the optical head is less than 1 kilooersted.

7. In a magneto-optical recording device that includes an optical head and performs erasure and recording on a magneto-optical disc, a magnetic head comprising:

a support member;

first means, mounted on said support member, for generating initialization magnetic fields perpendicular to a surface of the disc on each side of the optical head; and second means, mounted on said support member, for generating amplification magnetic fields parallel to the disc surface for amplifying the initialization magnetic fields such that a synthesized magnetic field is produced and is impressed on the disc as a recording magnetic field at the position of the optical head.

8. The magnetic field generation mechanism of claim 7 wherein said support member is nonmagnetic.

9. The magnetic field generation mechanism of claim 7 wherein said support member is magnetic.

10. The magnetic field generation mechanism of claim 7 wherein the initialization magnetic fields point toward the disc and the amplification magnetic fields point in a direction facing the optical head.

11. The magnetic field generation mechanism of claim 10 wherein said first means includes first and second magnets disposed symmetrically relative to the direction of movement of the optical head and said second means includes third and fourth magnets disposed symmetrically relative to the direction of movement of the optical head and surrounding said first and second magnets, respectively.

12. A magneto-optical recording device that performs erasure and recording on a magneto-optical disc, the device comprising:

an optical head including means for producing magnetic fields parallel to the disc; and a magnetic head including:

a support member, first means, mounted on said support member, for generating initialization magnetic fields perpendicular to a surface of the disc on each side of the optical head, and second means, mounted on said support member, for generating amplification magnetic fields parallel to the disc surface for amplifying the initialization magnetic fields such that a synthesized magnetic field is produced and is impressed on the disc as a recording magnetic field at the position of the optical head.

13. The device of claim 12 wherein the initialization magnetic fields point toward the disc and the amplification magnetic fields point in a direction facing the optical head.

14. The device of claim 13 wherein said first means includes first and second magnets disposed symmetrically relative to the direction of movement of the optical head and said second means includes third and fourth magnets disposed symmetrically relative to the direction of movement of the optical head and surrounding said first and second magnets, respectively.

15. The device of claim 12 wherein said support member is nonmagnetic.

16. A magneto-optical recording device that performs erasure and recording on a magneto-optical disc, the device comprising:

an optical head including means for producing magnetic fields parallel to the disc; and a magnetic head including a support member, first means, mounted on said support member, for generating an initialization magnetic field perpendicular to a surface of the disc, second means, mounted on said support member, for generating an amplification magnetic field parallel to the disc surface for amplifying the initialization magnetic field, and third means, mounted on said support member, for producing an inverted magnetic field in a direction opposite to that of the initialization magnetic field;

wherein a synthesized magnetic field is produced and is impressed on the disc as a recording magnetic field at the position of the optical head.

17. The device of claim 16 wherein the initialization magnetic field points toward the disc and the amplification magnetic field points in a direction facing the optical head.

18. The device of claim 16 wherein said first means includes a first magnet, said second means includes a second magnet, and said third means includes a third magnet; and wherein said first, second and third magnets are disposed asymmetrically relative to the direction of movement of the optical head.

19. The device of claim 16 wherein said support member is nonmagnetic.

20. The device of claim 16, further comprising fourth means, mounted on said support member, for producing adjustment magnetic fields.

21. The device of claim 20 wherein the initialization magnetic field points toward the disc and the amplification magnetic field points in a direction facing the optical head.

22. The device of claim 20 wherein said first means includes a first magnet, said second means includes a second magnet, and said third means includes a third magnet; and wherein said first, second and third magnets are disposed asymmetrically relative to the direction of movement of the optical head.

23. The device of claim 22 wherein said fourth means includes fourth, fifth and sixth magnets managed such that said fourth magnet generates a magnetic field in the same direction as that of the inverted magnetic field, said fifth and sixth magnets each generate a magnetic field in the same direction as that of initialization magnetic field; and wherein said fourth, fifth and sixth magnets are disposed asymmetrically relative to the direction of movement of the optical head, with said fifth magnet being disposed at the position of the optical head.

24. A magneto-optical recording device that performs erasure and recording on a magneto-optical disc, the device comprising:

a support member;

first means, mounted on said support member, for generating initialization magnetic fields perpendicular to a surface of the disc on each side of the optical head;

second means, mounted on said support member, for generating amplification magnetic fields parallel to the disc surface for amplifying the initialization magnetic fields;

third means, disposed at the center position of the optical head, for providing a biasing magnetic field; and means, mounted on said support member, for controlling the direction of the biasing magnetic field;

wherein a synthesized magnetic field is produced and is impressed on the disc as a recording magnetic field at the position of the optical head.

25. The device of claim 24 wherein the initialization magnetic fields point toward the disc and the amplification magnetic fields point in a direction facing the optical head.

26. The device of claim 25 wherein said first means includes first and second magnets disposed symmetrically relative to the direction of movement of the optical head and said second means includes third and fourth magnets disposed symmetrically relative to the direction of movement of the optical head and surrounding said first and second magnets, respectively.

27. The device of claim 26 wherein said third means includes a third magnet which is controlled by said controlling means to rotate within a prescribed angular range.

28. The device of claim 27 further comprising an optical head including means for producing magnetic fields parallel to the disc.

* * * * *